US012758911B2

(12) United States Patent
Peng

(10) Patent No.: US 12,758,911 B2
(45) Date of Patent: Oct. 13, 2026

(54) AIR CONDITIONER

(71) Applicants: MIDEA GROUP CO., LTD., Foshan (CN); GD MIDEA AIR-CONDITIONING EQUIPMENT CO., LTD., Foshan (CN)

(72) Inventor: Daijie Peng, Foshan (CN)

(73) Assignees: MIDEA GROUP CO., LTD., Foshan (CN); GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 313 days.

(21) Appl. No.: 18/578,162

(22) PCT Filed: Sep. 13, 2021

(86) PCT No.: PCT/CN2021/117998
§ 371 (c)(1),
(2) Date: Jan. 10, 2024

(87) PCT Pub. No.: WO2023/004951
PCT Pub. Date: Feb. 2, 2023

(65) Prior Publication Data

US 2024/0325959 A1 Oct. 3, 2024

(30) Foreign Application Priority Data

Jul. 26, 2021 (CN) ......................... 202110844422.7
Jul. 26, 2021 (CN) ......................... 202110846002.2
(Continued)

(51) Int. Cl.
*B01D 46/00* (2022.01)
*B01D 46/42* (2006.01)
*F24F 8/20* (2021.01)

(52) U.S. Cl.
CPC ......... *B01D 46/4254* (2013.01); *B01D 46/00* (2013.01); *B01D 46/0005* (2013.01);
(Continued)

(58) Field of Classification Search
CPC ............................ B01D 46/00; B01D 46/0005
See application file for complete search history.

(56) References Cited

U.S. PATENT DOCUMENTS

2004/0007002 A1 1/2004 Asami et al.

FOREIGN PATENT DOCUMENTS

CN 203274056 U 11/2013
CN 204387945 U 6/2015
(Continued)

OTHER PUBLICATIONS

The World Intellectual Property Organization (WIPO) Written Opinion for PCT/CN2021/117998 Apr. 28, 2022 9 pages (including English translation).

(Continued)

*Primary Examiner* — Robert A Hopkins
(74) *Attorney, Agent, or Firm* — Anova Law Group, PLLC

(57) ABSTRACT

An air conditioner includes a casing having an air outflowing cavity. A side wall of the air outflowing cavity has an air outflowing opening. The air conditioner further includes an air treatment device disposed in the casing and having an air inlet and an air outlet, and a light emission component provided at an outer peripheral side of the air outlet and configured to emit light towards the air outflowing cavity.

20 Claims, 24 Drawing Sheets

(30) Foreign Application Priority Data

| | | |
|---|---|---|
| Jul. 26, 2021 | (CN) | 202110846012.6 |
| Jul. 26, 2021 | (CN) | 202121713920.X |
| Jul. 26, 2021 | (CN) | 202121713969.5 |
| Jul. 26, 2021 | (CN) | 202121713971.2 |

(52) U.S. Cl.
CPC ............ *B01D 46/0047* (2013.01); *F24F 8/20* (2021.01); *B01D 2279/50* (2013.01)

(56) References Cited

FOREIGN PATENT DOCUMENTS

| | | | | |
|---|---|---|---|---|
| CN | 104949220 | A | | 9/2015 |
| CN | 204880365 | U | | 12/2015 |
| CN | 106839089 | A | | 6/2017 |
| CN | 107023885 | A | | 8/2017 |
| CN | 206739562 | U | | 12/2017 |
| CN | 206944336 | U | | 1/2018 |
| CN | 108278668 | A | | 7/2018 |
| CN | 108731112 | A | | 11/2018 |
| CN | 109323333 | A | | 2/2019 |
| CN | 109812869 | A | | 5/2019 |
| CN | 209558533 | U | | 10/2019 |
| CN | 110645634 | A | | 1/2020 |
| CN | 210801403 | U | | 6/2020 |
| CN | 212319915 | U | | 1/2021 |
| CN | 212511455 | U | | 2/2021 |
| CN | 215675474 | U | | 1/2022 |
| CN | 215909222 | U | | 2/2022 |
| CN | 216114353 | U | | 3/2022 |
| JP | 2010084690 | A | | 4/2010 |
| JP | 2015109910 | A | | 6/2015 |
| JP | 2016211845 | A | * | 12/2016 |
| JP | 2020165554 | A | | 10/2020 |
| KR | 20180104206 | A | | 9/2018 |
| WO | 2013176213 | A1 | | 11/2013 |
| WO | 2013176214 | A1 | | 11/2013 |
| WO | 2018120725 | A1 | | 7/2018 |

OTHER PUBLICATIONS

The European Patent Office (EPO) Extended Search Report for EP Application No. 21951526.9, Jul. 30, 2024 11 Pages.
The World Intellectual Property Organization (WIPO) International Search Report for PCT/CN2021/117998 Apr. 28, 2022 6 pages (including English translation).
China National Intellectual Property Administration (CNIPA) Office Action 1 for Application No. 202110844422.7, Apr. 25, 2025 12 Pages (including translation).
China National Intellectual Property Administration (CNIPA) Office Action 1 for Application No. 202110846002.2, Apr. 29, 2025 12 Pages (including translation).
China National Intellectual Property Administration (CNIPA) Office Action 1 for Application No. 202110846012.6, May 24, 2025 13 Pages (including translation).
The China National Intellectual Property Administration (CNIPA) The Notification to Grant Patent Right for Invention for Chinese Application 202110846002.2, Feb. 11, 2026 5 Pages (With Translation).

* cited by examiner

AIR CONDITIONER

CROSS-REFERENCE TO RELATED APPLICATIONS

This application is a National Stage Entry under 35 U.S.C. § 371 of International Application No. PCT/CN2021/117998, filed on Sep. 13, 2021, which is submitted based on and claims priority to Chinese patent applications Nos. 202121713920. X, 202110846012.6, 202121713969.5, 202121713971.2, 202110846002.2, 202110844422.7, all filed on Jul. 26, 2021, the entire contents of which are incorporated herein by reference.

FIELD

The present disclosure relates to the field of air treatment device, and more particularly, to an air conditioner.

BACKGROUND

With the upgrade in consumption and the pursuit of a high-quality lifestyle, it is difficult for an air treatment device in the related art to satisfy higher demands of users.

SUMMARY

The present disclosure aims to solve at least one of the technical problems in the related art. To this end, one object of the present disclosure is to provide an air conditioner, capable of facilitating a user to more intuitively see a position of a first air outlet and to more intuitively obtain a state of an air treatment device to enhance convenience of using the air conditioner and to satisfy higher demands of the user.

An air conditioner according to embodiments of the present disclosure includes a casing and an air treatment device. The casing has an air outflowing cavity. A side wall of the air outflowing cavity has a first air outflowing opening. The air treatment device is disposed in the casing. The air treatment device has an air inlet and a first air outlet. Air introduced from the air inlet flows into the air outflowing cavity through the first air outlet and is blown out through the first air outflowing opening. An outer peripheral side of the first air outlet is provided with a light emission component adapted to emit light towards the air outflowing cavity.

In the air conditioner according to the embodiments of the present disclosure, indoor air quality can be improved by providing the air treatment device. Furthermore, the light emission component is disposed at the outer peripheral side of the first air outlet, and when the air treatment device operates, it is easy for the user to more intuitively see the position of the first air outlet and to more intuitively obtain the state of the air treatment device by the light emission component emitting the light towards air outflowing cavity. In this way, the convenience of using the air conditioner is enhanced, and the higher demands of the user are satisfied.

According to some embodiments of the present disclosure, the air treatment device includes an air treatment unit and an air outflowing housing. The air outflowing housing has an air outflowing chamber in communication with an inner chamber of the air treatment unit. The air outflowing housing has the first air outlet in communication with the air outflowing chamber and an accommodation chamber configured to accommodate the light emission component. A side of the accommodation chamber facing towards the air outflowing cavity is provided with a light-permeable member.

According to some exemplary embodiments of the present disclosure, the air conditioner further includes an air guide mechanism movably disposed in the casing in an axial direction of the first air outlet to open or close the first air outlet. At least part of a projection of the light-permeable member on a reference surface is located within a projection of the air guide mechanism on the reference surface. The reference surface is perpendicular to the axial direction of the first air outlet.

According to some exemplary embodiments of the present disclosure, the projection of the light-permeable member on the reference surface is located within the projection of the air guide mechanism on the reference surface; and a light transmission channel is formed between the air guide mechanism and the air outflowing housing when the first air outlet is closed by the air guide mechanism. The light transmission channel has a radial inner end facing towards the light-permeable member and a radial outer end formed as a light outlet.

According to some exemplary embodiments of the present disclosure, each of the accommodation chamber, the light emission component, and the light-permeable member extends in a circumferential direction of the first air outlet; and the light-permeable member has a radial width smaller than a radial width of the light emission component.

According to some exemplary embodiments of the present disclosure, the light-permeable member is in an annular shape and formed as a periphery of the first air outlet.

According to some exemplary embodiments of the present disclosure, the air outflowing housing includes a housing body, an air outflowing member, and a fixation support. A top of the housing body has a mounting opening; the air outflowing member is disposed at the mounting opening and has the first air outlet; the fixation support is disposed at the air outflowing member and located at the outer peripheral side of the first air outlet; the fixation support is connected to the housing body; and the accommodation chamber is formed between the fixation support and the air outflowing member.

According to some exemplary embodiments of the present disclosure, the air outflowing member has an accommodation groove located at the outer peripheral side of the first air outlet. The light emission component is disposed in the accommodation groove, the accommodation groove has a side opened towards the air outflowing cavity to form an opening; the fixation support covers a part of the opening in a radial direction of the first air outlet; the accommodation chamber is formed between an inner wall of the accommodation groove and the fixation support; and an uncovered part of the opening is formed as the light-permeable member.

According to some exemplary embodiments of the present disclosure, a side of the light emission component facing away from the light-permeable member is provided with a first engagement member; and a wall of the accommodation chamber has a first engagement hole engaged with the first engagement member.

In some exemplary embodiments of the present disclosure, the side of the light emission component facing away from the light-permeable member is provided with a positioning protrusion; and the wall of the accommodation cavity has a positioning hole engaged with the positioning protrusion.

According to some exemplary embodiments of the present disclosure, a peripheral side wall of the air outflowing housing has at least one second air outlet; and the casing has a second air outflowing opening facing towards the second air outlet and in communication with the second air outlet.

According to some embodiments of the present disclosure, the air conditioner includes an air guide mechanism and a drive assembly. The air guide mechanism is movably disposed in the casing in an up-down direction to open or close the first air outlet. The air guide mechanism includes an air guide mechanism body and a decoration cover covering at a top of the air guide mechanism body. The air guide mechanism body includes a first air guide member and a second air guide member connected to each other in a horizontal direction. Each of the first air guide member and the second air guide member is an independent molded member. The drive assembly includes a drive mechanism and a drive member disposed at the air guide mechanism. The drive mechanism is engaged with the drive member in a transmission manner to drive the air guide mechanism to move up and down.

According to some exemplary embodiments of the present disclosure, the air guide mechanism body is detachably connected to the decoration cover; and the drive member is disposed at the air guide mechanism body.

In some exemplary embodiments of the present disclosure, the first air guide member is detachably connected to the second air guide member; and the drive member is disposed at one of the first air guide member and the second air guide member.

According to some exemplary embodiments of the present disclosure, the air guide mechanism further includes a liner plate disposed between the air guide mechanism body and the decoration cover. The liner plate is detachably connected to the air guide mechanism body.

In some exemplary embodiments of the present disclosure, the decoration cover is connected to the liner plate by an adhesive layer; and at least a middle part of the liner plate protrudes upwards to form a protrusion. The adhesive layer is disposed at the protrusion.

According to some exemplary embodiments of the present disclosure, the first air guide member includes a first air guide part and a first movable part connected below the first air guide part; and the second air guide member includes a second air guide part and a second movable part connected below the second air guide part. A butt-joint line between the first air guide part and the second air guide part surrounds the first air guide part, a butt-joint line between the first movable part and the second movable part extends in the up-down direction, and the drive member is disposed at one of the first movable part and the second movable part.

In some exemplary embodiments of the present disclosure, the butt-joint line between the first air guide part and the second air guide part has a length greater than half of a circumference of the first air guide part.

According to some exemplary embodiments of the present disclosure, the air outflowing cavity is formed in the casing; the first air outflowing opening is formed at a front side wall of the air outflowing cavity; the first air outlet is in communication with the first air outflowing opening through the air outflowing cavity when the first air outlet is opened by the air guide mechanism; the decoration cover and at least part of the air guide mechanism body are located in the air outflowing cavity; and the at least part of the air guide mechanism body located in the air outflowing cavity has an airflow channel extending through the air guide mechanism body in a front-rear direction.

In some exemplary embodiments of the present disclosure, the first air guide member is butt-jointed to the second air guide member in the front-rear direction; and the airflow channel includes a first airflow channel formed in the first air guide member and a second airflow channel formed in the second air guide member.

According to some embodiments of the present disclosure, the air conditioner includes an air guide mechanism and a drive assembly. The air guide mechanism is movably disposed in the casing in an up-down direction to open or close the first air outlet. The drive assembly includes a drive mechanism and a drive member disposed at the air guide mechanism. The drive mechanism is engaged with the drive member in a transmission manner to drive the air guide mechanism to move up and down. The drive mechanism is provided with a drive motor disposed outside an air duct of the air treatment device.

According to some exemplary embodiments of the present disclosure, the drive member includes a rack, and the drive mechanism includes a gear transmission mechanism including a plurality of gears engaged in sequence. One of the plurality of gears located at a starting end of the gear transmission mechanism is connected to the drive motor, and one of the plurality of gears located at a tail end of the gear transmission mechanism is engaged with the rack. The drive assembly further includes a drive box. The drive mechanism is disposed in the drive box. The drive box has an avoidance opening, and a part of the gear located at the tail end of the gear transmission mechanism extends out of the drive box through the avoidance opening and is engaged with the rack. A first chamber and a second chamber are formed in the drive box, each of the drive motor and the gear located at the starting end of the gear transmission mechanism is located in the first chamber, the remaining of the plurality of gears of the gear transmission mechanism is all located in the second chamber. The avoidance opening is formed at a side wall of the second chamber, and the first chamber is located outside the air duct.

According to some embodiments of the present disclosure, the light emission component includes: a lamp socket having a mounting recess; a light emission member disposed in the mounting recess; and a lamp cover covering at an open end of the lamp socket. At least part of the lamp cover is accommodated in the mounting recess.

According to some exemplary embodiments of the present disclosure, the lamp cover is sealingly connected to the lamp socket by a sealant.

According to some exemplary embodiments of the present disclosure, an inner peripheral wall of the mounting recess has a first limit surface. The lamp cover abuts with the first limit surface.

According to some exemplary embodiments of the present disclosure, a side of the lamp cover adjacent to the light emission member is provided with a press protrusion. The press protrusion abuts against the light emission member.

According to some exemplary embodiments of the present disclosure, the light emission component further includes a light guide hood connected to the lamp socket and covering the lamp cover; and one of the light guide hood and the lamp socket is provided with a second engagement member, and the other one of the light guide hood and the lamp socket has a second engagement hole engaged with the second engagement member.

According to some exemplary embodiments of the present disclosure, each of the lamp socket and the light guide hood is in an annular shape; the second engagement member is provided at each of an inner peripheral wall and an outer peripheral wall of the lamp socket; and the second engagement hole is formed at each of an inner peripheral wall and an outer peripheral wall of the light guide hood.

Further, the inner peripheral wall of the lamp socket has a second limit surface; and the outer peripheral wall of the lamp socket has a third limit surface. The inner peripheral wall of the light guide hood abuts with the second limit surface, and the outer peripheral wall of the light guide hood abuts with the third limit surface.

Additional aspects and advantages of the embodiments of present disclosure will be provided at least in part in the following description, or will become apparent in part from the following description, or can be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings.

Figure 1:
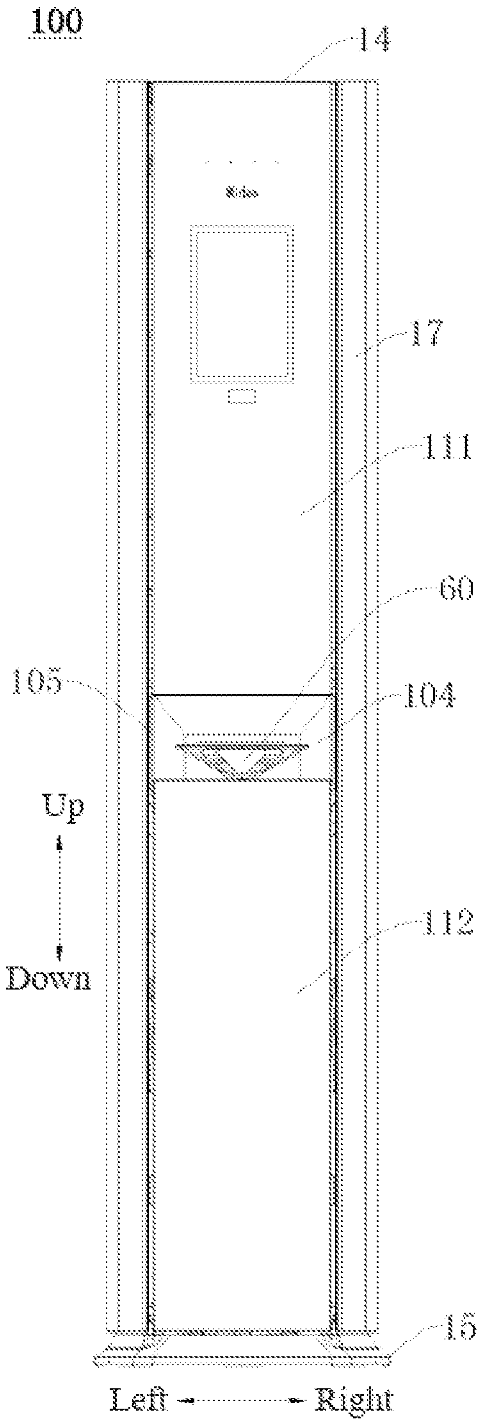
FIG. 1 is a front view of an air conditioner indoor unit according to some embodiments of the present disclosure, in which an air guide mechanism opens a first air outlet.
Figure 2:
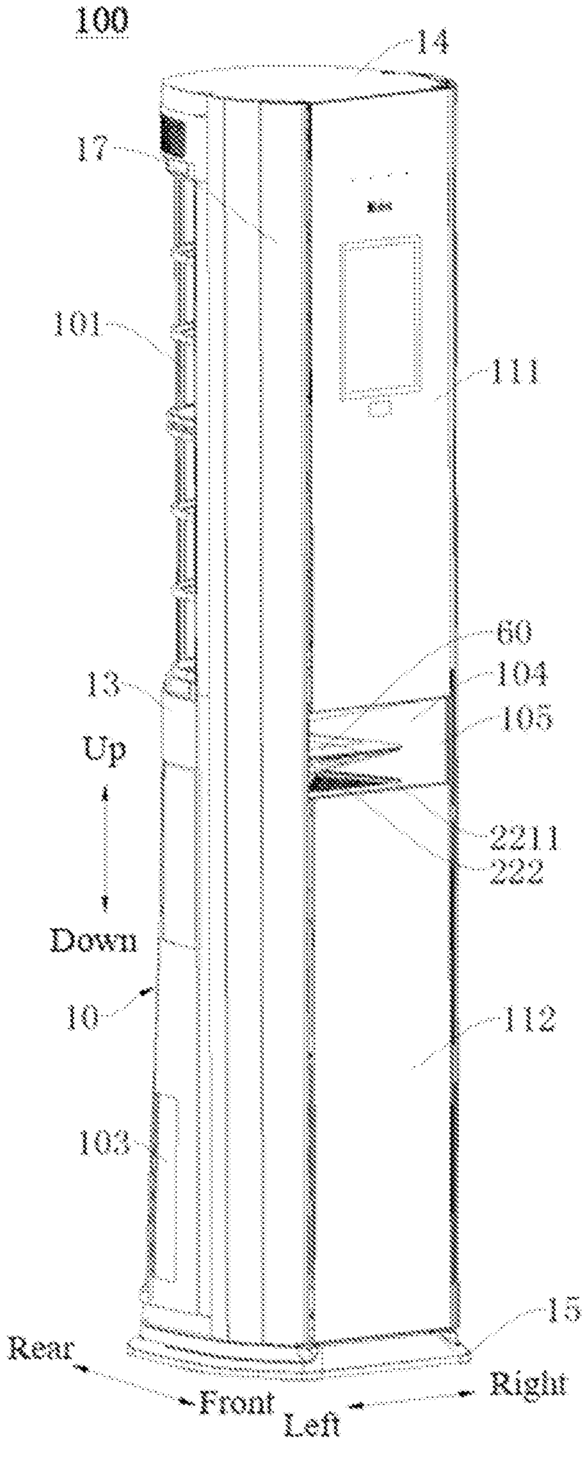
FIG. 2 is a perspective view of the air conditioner indoor unit of FIG. 1, in which the air guide mechanism opens the first air outlet.
Figure 3:
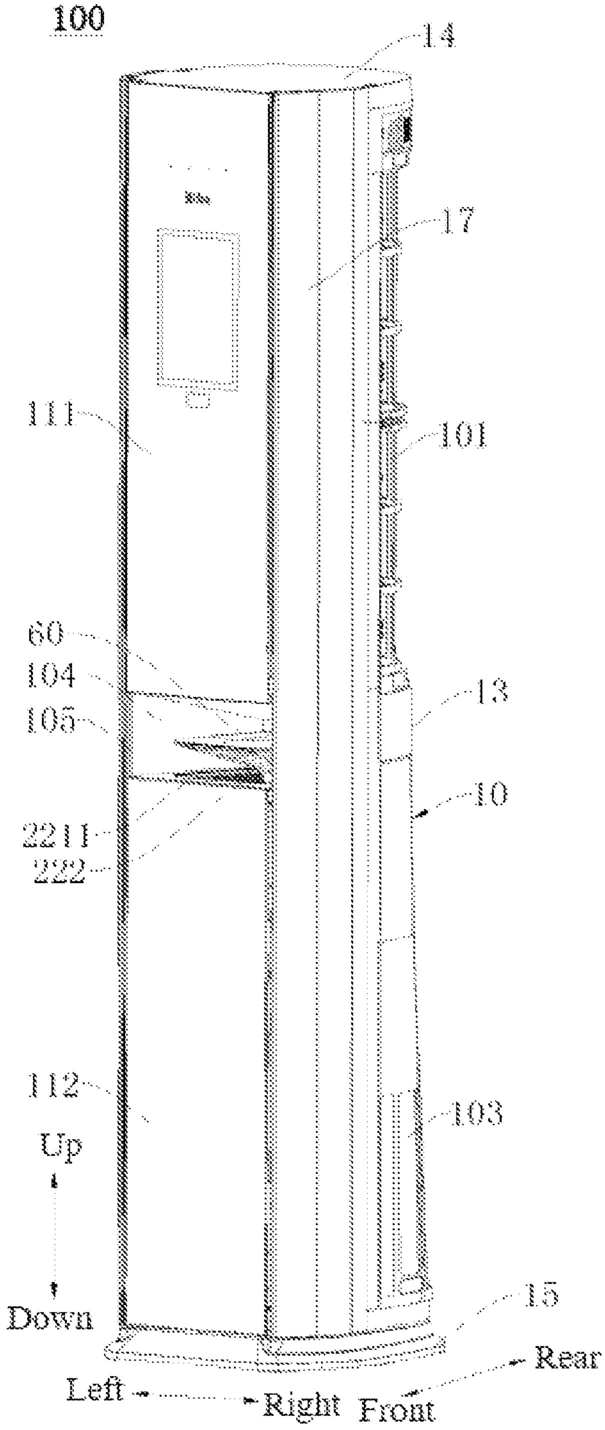
FIG. 3 is another perspective view of the air conditioner indoor unit of FIG. 1, in which the air guide mechanism opens the first air outlet.
Figure 4:
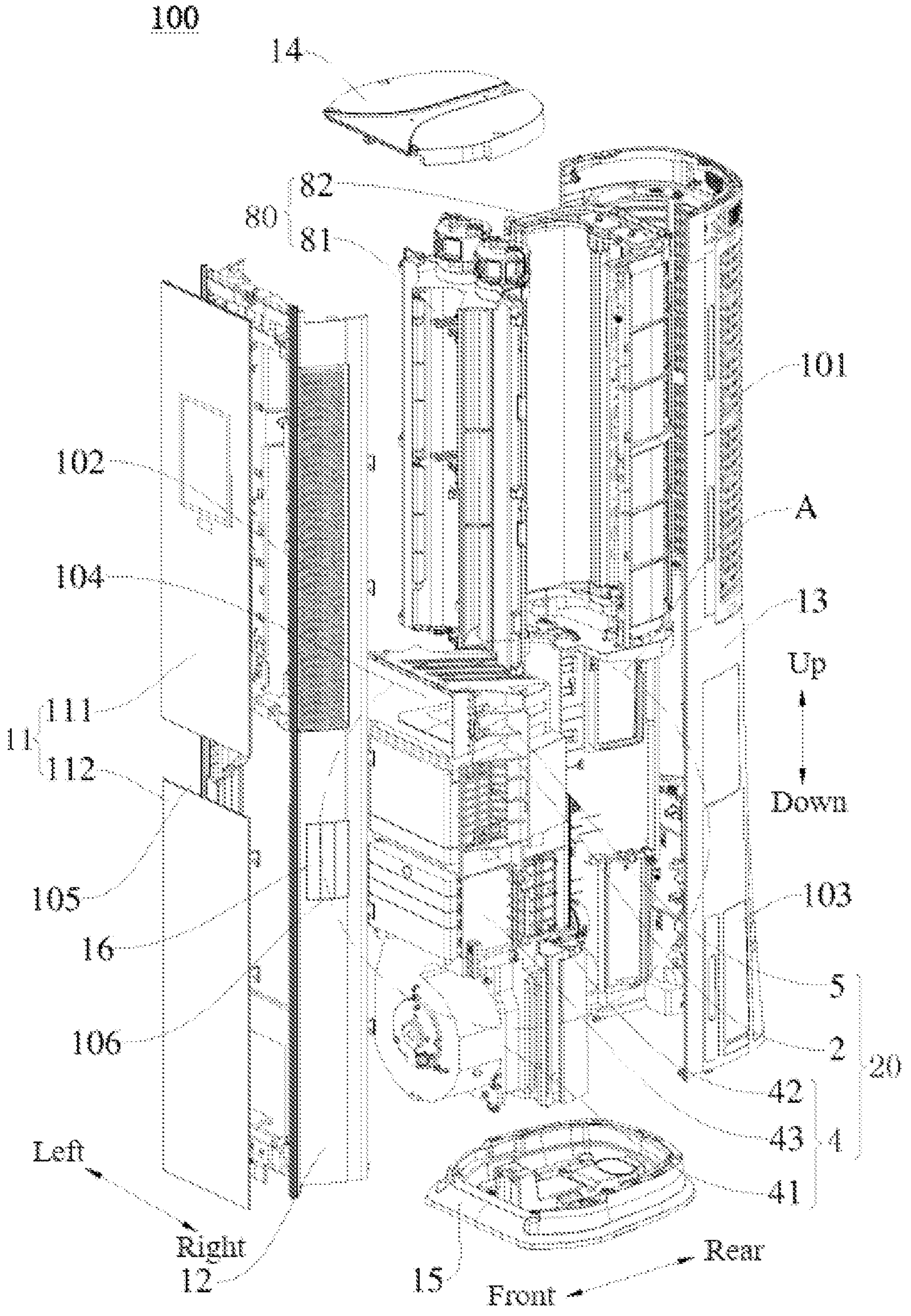
FIG. 4 is an exploded view of the air conditioner indoor unit of FIG. 1.
Figure 5:
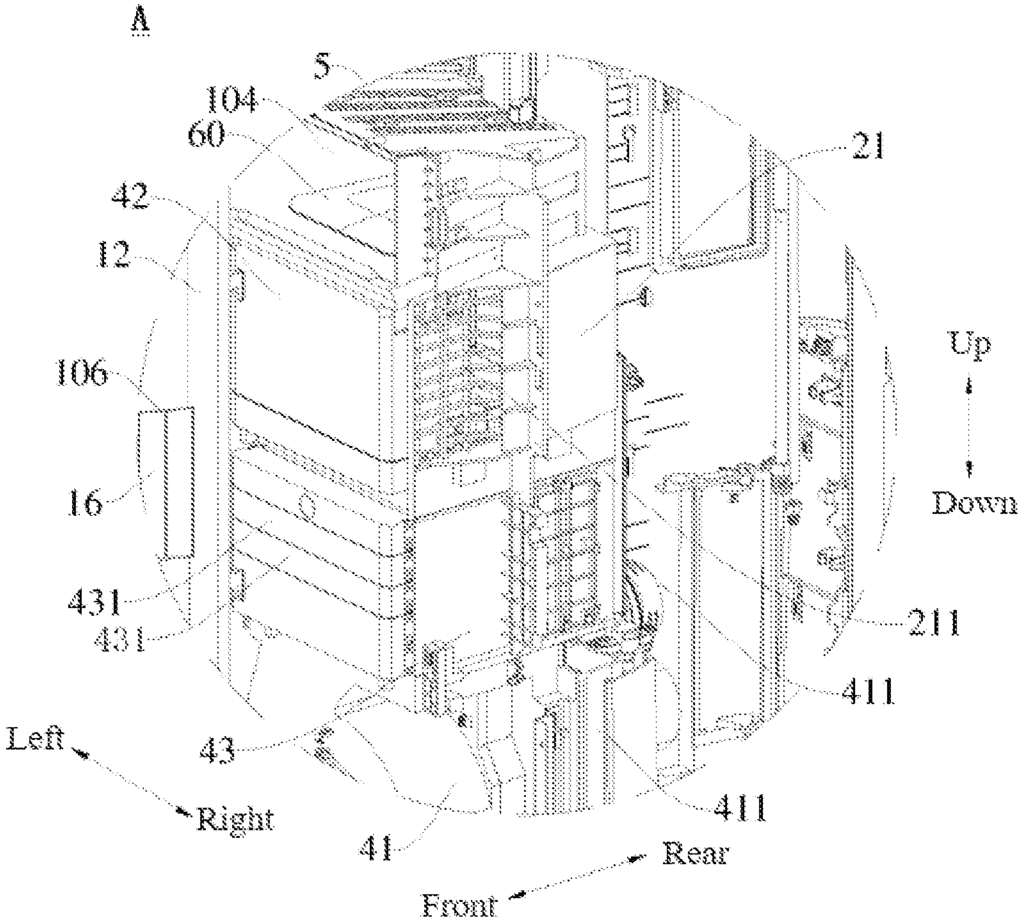
FIG. 5 is an enlarged view at a position A in FIG. 4.

REFERENCE NUMERALS air conditioner indoor unit 100;

casing 10; front panel 11; upper panel 111; lower panel 112; air outflowing frame component 12; rear housing component 13; top cover 14; chassis 15; air guide plate 16; swing door 17; heat exchange air inflowing opening 101; heat exchange air outflowing opening 102; indoor air inflowing opening 103; air outflowing cavity 104; first air outflowing opening 105; second air outflowing opening 106;

air treatment device 20;

air outflowing housing 2; air outflowing chamber 201; housing body 21; second air outlet 211; air outflowing member 22; air outflowing part 221; first air outlet 2211; accommodation groove 2212; first engagement hole 2213; positioning hole 2214; air outflowing grille 222; mounting part 223; accommodation space 2231; guide part 224; guide chamber 2241; guide groove 2242; fixation support 23; accommodation chamber 231; light-permeable member 232; light outlet 233;

light emission component 3; lamp socket 31; mounting recess 310; first limit surface 311; second limit surface 312; third limit surface 313; first engagement member 314; positioning protrusion 315; second engagement member 316; wire outlet part 317; lamp cover 32; seal recess 321; press protrusion 322; light emission member 33; light guide hood 34; second engagement hole 341;

air treatment unit 4; first fan component 41; air inlet 411; humidification component 42; purification component 43; purification member 431;

air induction hood 5;

air guide mechanism 60; air guide mechanism body 6*a*; first air guide member 61; first air guide part 611; first airflow channel 610; limit protrusion 6111; second fixation hole 6112; third engagement hole 6113; first movable part 612; third fixation hole 6121; second air guide member 62; second air guide part 621; second airflow channel 620; third engagement member 6211; second movable part 622; fourth fixation hole 6221; liner plate 6*b*; protrusion 61*b*; first fixation hole 62*b*; limit hole 63*b*; decoration cover 6*c;* drive assembly 70; drive mechanism 71; drive motor 711; gear transmission mechanism 712; gear 7121; drive member 72; rack 721; fifth fixation hole 722; guide rib 723; drive box 73; first chamber 731; second chamber 732; avoidance opening 733; first box 734; second box 735;

air heat exchange device 80; second fan component 81; and heat exchanger component 82.

DETAILED DESCRIPTION OF THE EMBODIMENTS

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain rather than limit the present disclosure.

An air conditioner according to embodiments of the present disclosure will be described below with reference to the accompanying drawings.

As illustrated in FIGS. 1 to 8, an air conditioner according to embodiments of the present disclosure includes a casing 10 and an air treatment device 20.

The casing 10 may have an air outflowing cavity 104, and a side wall of the air outflowing cavity 104 has a first air outflowing opening 105 in communication with an ambient environment. For example, the first air outflowing opening 105 is formed at a front side wall of the air outflowing cavity 104, and the casing 10 is partially formed as a side wall of the air outflowing cavity 104. When the air conditioner is placed in an indoor space for operation, the ambient environment refers to the indoor space.

The air treatment device 20 may be disposed in the casing 10. The air treatment device 20 may include an air treatment unit 4. The air treatment device 20 may have an air inlet 411 and a first air outlet 2211. When the air treatment device 20 operates, air introduced into the air treatment device 20 from the air inlet 411 may be treated by the air treatment unit 4. After passing through the air treatment device 20, the air flows into the air outflowing cavity 104 through the first air outlet 2211 of the air treatment device 20. Airflow flowing into the air outflowing cavity 104 is blown out indoors through the first air outflowing opening 105, and therefore indoor air quality can be improved.

In another exemplary embodiment of the present disclosure, when the air treatment device 20 operates, the airflow flows into the air treatment unit 4 through the air inlet 411, and may be humidified, purified, etc. by the air treatment unit 4. If the air inlet 411 is in communication with the indoor air, the indoor air is processed by the air treatment unit 4 and flows indoors to improve the indoor air quality. If the air inlet 411 is in communication with outdoor air, introduced outdoor air is processed by the air treatment unit 4 and flows indoors to process fresh air while introducing the fresh air, to further improve the indoor air quality.

In another exemplary embodiment of the present disclosure, the air conditioner may further include an air guide mechanism 60 configured to open or close the first air outlet 2211, and the air guide mechanism 60 may be movably disposed in the casing 10 in an axial direction of the first air outlet 2211. When the first air outlet 2211 is opened by the air guide mechanism 60, the first air outlet 2211 is in communication with the first air outflowing opening 105 through the air outflowing cavity 104. When the first air outlet 2211 is closed by the air guide mechanism 60, the first air outlet 2211 is isolated from the first air outflowing opening 105. Through the movable air guide mechanism 60 disposed in the casing 10, communication or isolation between the first air outlet 2211 of the air treatment device 20 and the first air outflowing opening 105 can be realized through a movement of the air guide mechanism 60. Therefore, air outflow of the first air outflowing opening 105 can be controlled by controlling the movement of the air guide mechanism 60.

An outer peripheral side of the first air outlet 2211 may be provided with a light emission component 3, and the light emission component 3 may extend in a circumferential direction of the first air outlet 2211. For example, the light emission component 3 may be an arc-shaped or annular-shaped. The light emission component 3 may be adjacent to the first air outlet 2211. When the light emission component 3 emits light, a boundary position of the first air outlet 2211 can be seen from an outer part, which facilitates a user to more intuitively see the position of the first air outlet 2211. When the light emission component 3 operates, the light emission component 3 is adapted to emit light towards the air outflowing cavity 104, and therefore the user can see the light emitted by the light emission component 3 towards the air outflowing cavity 104 from the first air outflowing opening 105. By seeing the light in the air outflowing cavity 104, it is easy for the user to more intuitively obtain a state of the air treatment device 20. In this way, convenience of using the air conditioner is enhanced, and higher demands of the user are satisfied.

For example, when the air treatment device 20 operates, the light emission component 3 can be controlled to be turned on, and the light emitted by the light emission component 3 is directed towards an inner side of the air outflowing cavity 104. In this way, the user can see light in the air outflowing cavity 104 through the first air outflowing opening 105, and therefore it is more convenient and intuitive to obtain that the air treatment device 20 is currently in an operational state. When the air treatment device 20 does not operate, the light emission component 3 can be controlled to stop operating. In this way, there is no light emitted by the light emission component 3 towards the inner side of the air outflowing cavity 104 in the air outflowing cavity 104, and the user can also conveniently and intuitively obtain that the air treatment device 20 is currently in a non-operational state. By controlling whether the light emission component 3 is turned on based on whether the air treatment device 20 operates, the user can quickly and intuitively know whether the air treatment device 20 is currently in the operational state.

Further, when the air treatment device 20 is in the operational state, the indoor air quality can also be known through a light emission color of the light emission component 3. For example, the air conditioner may include an air quality detection device configured to detect the indoor air quality. The air quality detection device may detect indoor carbon dioxide content, formaldehyde content, PM 2.5 (Particular Matter 2.5) content, etc. The air quality detection device may be in communication with the light emission component 3. The light emission component 3 may adjust the light emission color based on a detection result of the air quality detection device. When the indoor air quality is different, the light emission component 3 may emit light of different colors. For example, an indoor air quality result detected by the air quality detection device may be classified into poor, fair, and good. When an indoor air quality result is poor, the light emission component 3 emits red light. When the indoor air quality result is fair, the light emission component 3 emits yellow light. When the indoor air quality result is good, the light emission component 3 emits green light. Therefore, the user can quickly and intuitively understand current indoor air quality from the light emission color of the light emission component 3 to allow for the enhanced convenience of using the air conditioner. In this way, user experience is improved, and the higher demands of the user are satisfied.

The air conditioner of the present disclosure may include an air heat exchange device 80. The air treatment device 20 may be located at one side of the air heat exchange device 80. For example, the air treatment device 20 is located at an upper side or a lower side of the air heat exchange device 80.

The air heat exchange device 80 may exchange heat with air, and an indoor ambient temperature is thus adjusted.

In another exemplary embodiment of the present disclosure, the air conditioner may be a split type air conditioner. For example, the air conditioner may be a split floor-standing air conditioner or a split wall-mounted air conditioner; and the air conditioner may also be an integrated air conditioner. When the air conditioner is a split type air conditioner, the air conditioner includes an air conditioner indoor unit 100 and an air conditioner outdoor unit. The air conditioner indoor unit 100 includes the air treatment device 20 and the air heat exchange device 80 described above.

In the air conditioner according to the embodiments of the present disclosure, the indoor air quality can be improved by providing the air treatment device 20. Furthermore, the light emission component 3 is disposed at the outer peripheral side of the first air outlet 2211, and when the air treatment device 20 operates, it is easy for the user to more intuitively see the position of the first air outlet 2211 and to more intuitively obtain the state of the air treatment device 20 by the light emission component 3 emitting the light towards the air outflowing cavity 104. In this way, the convenience of using the air conditioner is enhanced, and the higher demands of the user are satisfied.

According to some embodiments of the present disclosure, referring to FIGS. 4 to 11, the air treatment device 20 may include an air treatment unit 4 and an air outflowing housing 2 disposed on the air treatment unit 4. The air outflowing housing 2 may be disposed above the air treatment unit 4 and may have an air outflowing chamber 201 in communication with an inner chamber of the air treatment unit 4. The air outflowing housing 2 may have a first air outlet 2211 in communication with the air outflowing chamber 201. When the air treatment device 20 operates, the first air outlet 2211 may be in communication with the first air outflowing opening 105 through the air outflowing cavity 104. The air introduced from the air inlet 411 into the inner chamber of the air treatment unit 4 flows into the air outflowing chamber 201 of the air outflowing housing 2 after being treated by the air treatment unit 4, and then flows into the air outflowing cavity 104 in the casing 10 through the first air outlet 2211, and finally is blown out indoors through the first air outflowing opening 105 at the casing 10. Therefore, the indoor air quality can be improved. As such, the air treated by air treatment unit 4 can be guided into air outflowing cavity 104 by providing the air outflowing housing 2.

The air outflowing housing 2 further has an accommodation chamber 231 configured to accommodate the light emission component 3. The light emission component 3 is mounted and accommodated in the accommodation chamber 231, and a side of the accommodation chamber 231 facing towards the air outflowing cavity 104 is provided with a light-permeable member 232. The light emitted by the light emission component 3 may be emitted into air outflowing cavity 104 through the light-permeable member 232. By mounting and accommodating the light emission component 3 in the accommodation chamber 231 formed at the air outflowing housing 2, mounting and fixing of the light emission component 3 can be facilitated, and a structure is compact. Furthermore, an influence of the air blown out from the first air outlet 2211 on the light emission component 3 can be reduced. For example, when the air blown out from the first air outlet 2211 is humidified air, the impact on a service life and reliability of the light emission component 3 can be reduced due to the contact between the air blown out from the first air outlet 2211 and the light emission component 3.

In another exemplary embodiment of the present disclosure, the above-mentioned light-permeable member 232 may be a light-permeable hole or may be a transparent solid structure.

According to some exemplary embodiments of the present disclosure, referring to FIGS. 1 to 11, the air conditioner may include an air guide mechanism 60, and the air guide mechanism 60 may be movably disposed in the casing 10 in an axial direction of the first air outlet 2211. For example, the axial direction of the first air outlet 2211 extends in an up-down direction, and the air guide mechanism 60 may be movably disposed in the casing 10 in the up-down direction. The first air outlet 2211 can be opened or closed by moving the air guide mechanism 60. Therefore, the communication or isolation between the first air outlet 2211 and the first air outflowing opening 105 can be conveniently controlled. Thus, the air outflowing of the first air outflowing opening 105 can be conveniently controlled. At least part of a projection of the light-permeable member 232 on a reference surface may be located in a projection of the air guide mechanism 60 on the reference surface, and the reference surface is perpendicular to the axial direction of the first air outlet 2211. For example, when the axial direction of the first air outlet 2211 is vertical, the reference surface may be parallel to a parallel surface. In this way, when the first air outlet 2211 is closed by the air guide mechanism 60, the air guide mechanism 60 may obscure at least part of the light-permeable member 232. Therefore, an amount of light emitted by the light emission component 3 through the light-permeable member 232 into the air outflowing cavity 104 can be changed.

For example, when the first air outlet 2211 is opened by the air guide mechanism 60, the air guide mechanism 60 is spaced apart from the light-permeable member 232 and does not cover the light-permeable member 232, and the light emitted by the light emission component 3 is emitted into the air outflowing cavity 104 through the entire light-permeable member 232. In this case, it can be seen from the outer side of the air outflowing cavity 104 that the amount of light in the air outflowing cavity 104 is relatively large with relatively high brightness. When the first air outlet 2211 is closed by the air guide mechanism 60, the air guide mechanism 60 covers the at least part of the light-permeable member 232. When the part of the light-permeable member 232 is covered by the air guide mechanism 60, the light emitted by the light emission component 3 is emitted from an uncovered part of the light-permeable member 232 into the air outflowing cavity 104. When the light-permeable member 232 is completely covered by the air guide mechanism 60, the light emitted by the light emission component 3 may be emitted into the air outflowing cavity 104 through a gap between the light emission component 3 and the air outflowing housing 2 after passing through the light-permeable member 232. Compared with when the first air outlet 2211 is opened by the air guide mechanism 60, when the first air outlet 2211 is closed by the air guide mechanism 60, an amount of light emitted by the light emission component 3 into the air outflowing cavity 104 is significantly reduced in the case that amount of light emitted by the light emission component 3 is the same. In this way, the user can conveniently and intuitively know whether the first air outlet 2211 is opened by the air guide mechanism 60 and whether there is normal air outflow of the first air outflowing opening 105 by observing the amount of light or a brightness degree in the air outflowing cavity 104.

Figure 6:
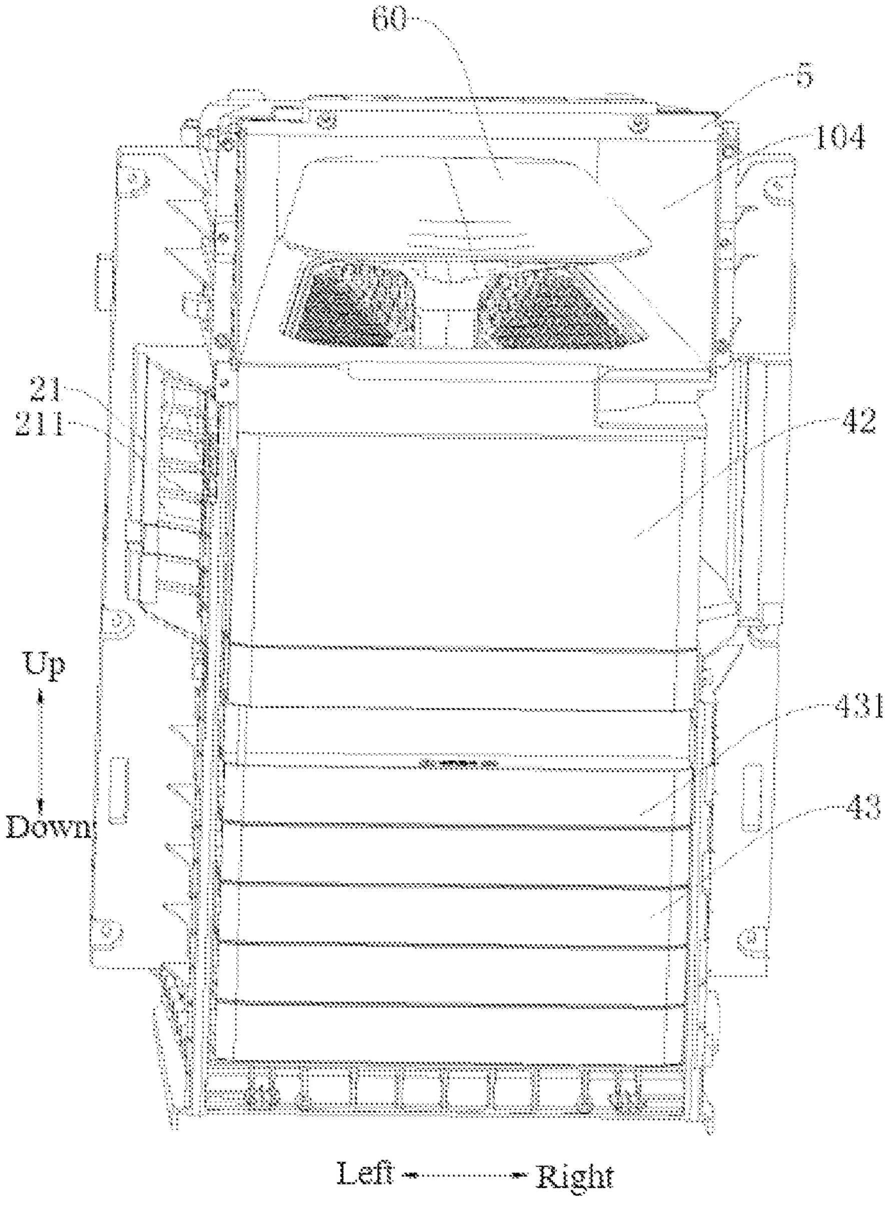
FIG. 6 is a partial structural perspective view of an air treatment device of FIG. 4, in which the air guide mechanism opens the first air outlet.
Figure 7:
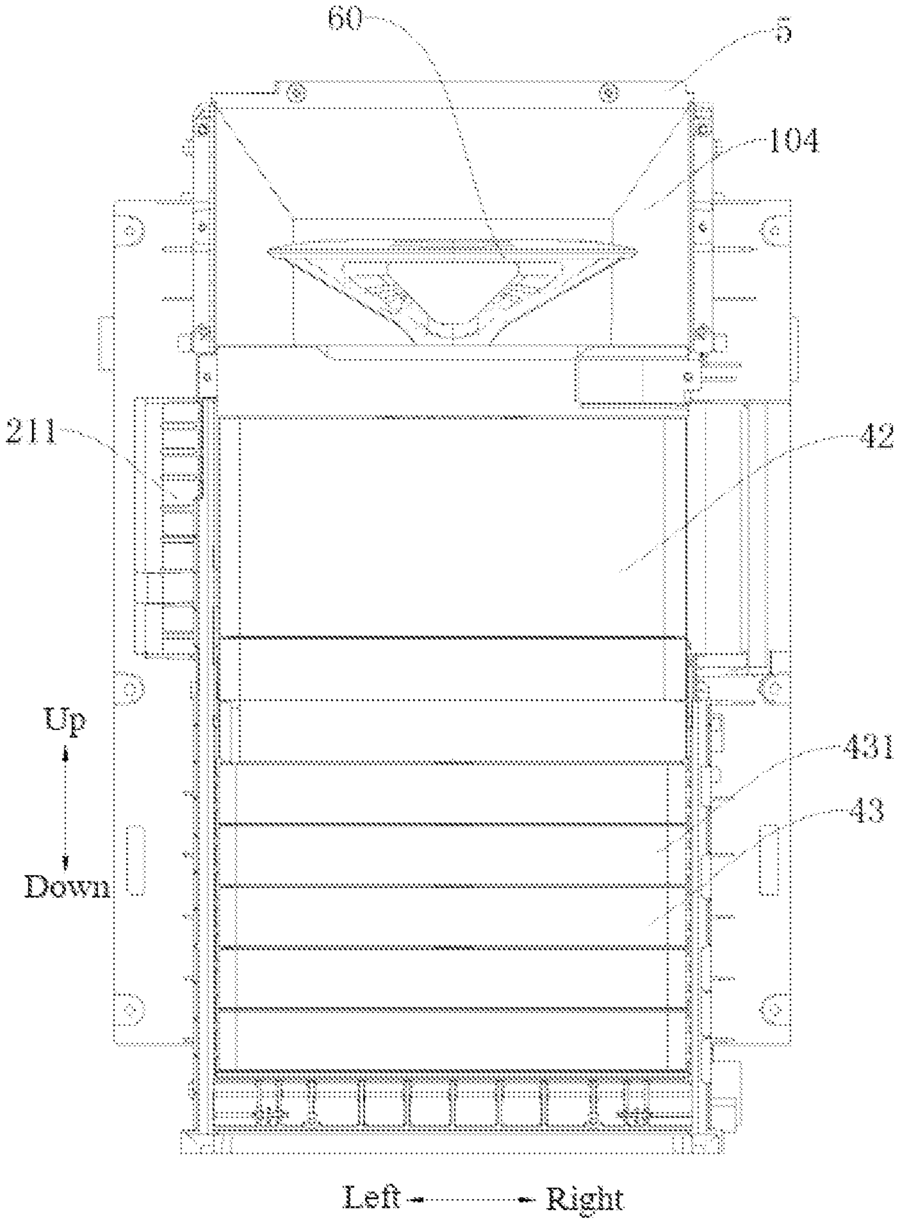
FIG. 7 is a partial structural front view of an air treatment device of FIG. 4, in which the air guide mechanism opens the first air outlet.
Figure 8:
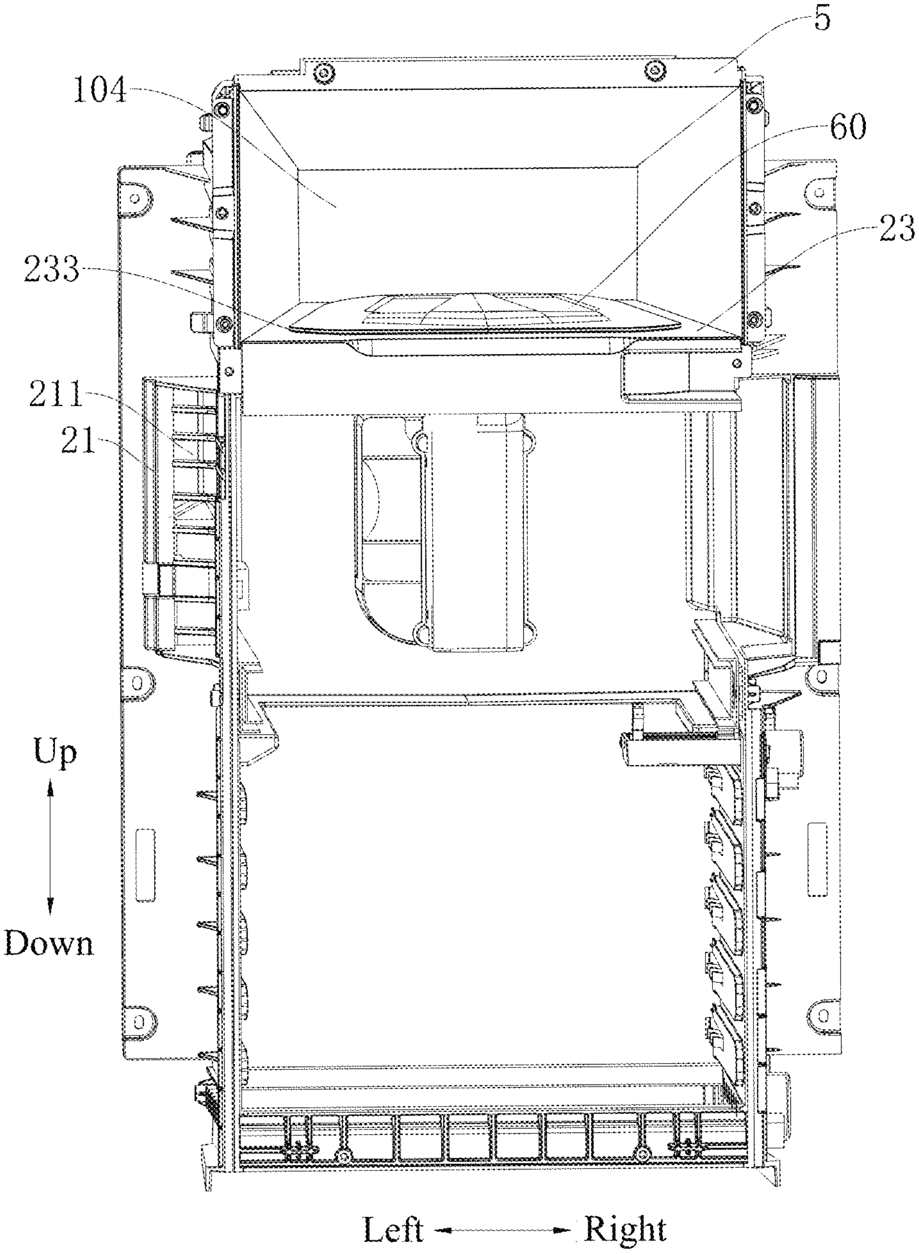
FIG. 8 is another partial structural perspective view of the air treatment device of FIG. 4, in which the air guide mechanism closes the first air outlet.

According to some exemplary embodiments of the present disclosure, referring to FIGS. 6 to 8, a peripheral side wall of the air outflowing housing 2 has at least one second air outlet 211. For example, the peripheral side wall of the air outflowing housing 2 has two second air outlets 211, and the two second air outlets 211 may be located at two sides of the air outflowing housing 2 facing towards each other. The casing 10 has a second air outflowing opening 106 facing towards the second air outlet 211 and in communication with the second air outlet 211. A number of the second air outflowing openings 106 and a number of the second air outlets 211 may be equal to each other and in one-to-one correspondence. At least part of the airflow flowing into the air outflowing housing 2 may be discharged from the second air outlet 211 and blown out indoors through the second air outflowing opening 106. After air introduced into the inner chamber of the air treatment unit 4 from the air inlet 411 is treated by the air treatment unit 4, it flows into the air outflowing chamber 201 of the air outflowing housing 2 and may be discharged from at least one of the first air outlet 2211 and the second air outlet 211. Therefore, an air outflowing effect of the air treatment device 20 can be enriched and air outflowing volume of the air treatment device 20 can be increased. In this way, efficiency of the air treatment device 20 in adjusting the indoor air quality can be improved.

In another exemplary embodiment of the present disclosure, a grille may be provided at the second air outlet 211.

In another exemplary embodiment of the present disclosure, an air guide plate 16 may be provided at the second air outflowing opening 106 and is configured to open or close the second air outflowing opening 106. The air guide plate 16 is rotatably disposed at the second air outflowing opening 106. One or more air guide plate 16 may be provided. When one air guide plate 16 is provided, the second air outflowing opening 106 is opened or closed by rotating the air guide plate 16; and when a plurality of air guide plates 16 is provided, the second air outflowing opening 106 is opened or closed by rotating the plurality of air guide plates 16. The opening and closing of the second air outflowing opening 106 can be conveniently controlled by providing the rotatable air guide plate 16 at the second air outflowing opening 106. Therefore, air outflowing of the second air outflowing opening 106 can be conveniently controlled.

It should be noted that the term "plurality of" in the present disclosure refers to two or more.

In another exemplary embodiment of the present disclosure, the air guide plate 16 and the air guide mechanism 60 may be controlled independently of each other. Therefore, the air outflowing of the first air outflowing opening 105 and the second air outflowing opening 106 may be controlled independently of each other. Thus, diversity of the air outflowing of the air treatment device 20 may be further enriched.

For example, when the first air outlet 2211 is opened by the air guide mechanism 60 and the second air outlet 211 is closed by the air guide plate 16, the airflow flowing into the inner chamber of the air treatment unit 4 from the air inlet 411 flows into the air outflowing chamber 201 in the air outflowing housing 2 after being treated by the air treatment unit 4, and then flows into the air outflowing cavity 104 through the first air outlet 2211, and finally is blown out indoors through the first air outflowing opening 105. When the first air outlet 2211 is closed by the air guide mechanism 60 and the second air outlet 211 is opened by the air guide plate 16, the airflow flowing into the inner chamber of the air treatment unit 4 from the air inlet 411 flows into the air outflowing chamber 201 in the air outflowing housing 2 after being treated by the air treatment unit 4, and then is blown out indoors through the second air outlet 211 and the second air outflowing opening 106 in sequence. When the first air outlet 2211 is opened by the air guide mechanism 60 and the second air outlet 211 is opened by the air guide plate 16, the airflow flowing into the inner chamber of the air treatment unit 4 from the air inlet 411 flows into the air outflowing chamber 201 in the air outflowing housing 2 after being treated by the air treatment unit 4. A part of the airflow flowing into the air outflowing chamber 201 flows into the air outflowing cavity 104 through the first air outlet 2211 and is finally blown out indoors through the first air outflowing opening 105, and another part is blown out indoors through the second air outlet 211 and the second air outflowing opening 106 in sequence. Therefore, the air outflowing volume can be increased. In this way, the efficiency of the air treatment device 20 in adjusting the indoor air quality can be improved.

In some exemplary embodiments of the present disclosure, referring to FIGS. 5 and 9 to 12, the projection of the light-permeable member 232 on the reference surface may be located within the projection of the air guide mechanism 60 on the reference surface. When the first air outlet 2211 is closed by the air guide mechanism 60, the air guide mechanism 60 completely covers the light-permeable member 232, and a light transmission channel may be formed between the air guide mechanism 60 and the air outflowing housing 2. The light transmission channel may have a radial inner end facing towards the light-permeable member 232 and a radial outer end formed as a light outlet 233. When the first air outlet 2211 is closed by the air guide mechanism 60, the light emitted by the light emission component 3 enters into the light transmission channel through the light-permeable member 232, then travels in a radial direction of the light transmission channel, and is finally emitted into the air outflowing cavity 104 from the light outlet 233 of the light transmission channel.

In this way, when the air treatment device 20 operates and the first air outlet 2211 is closed by the air guide mechanism 60, although the air guide mechanism 60 completely covers the light-permeable member 232, the light emitted by the light emission component 3 may travel into the air outflowing cavity 104 through the light transmission channel. As a result, the user can still see the light emitted by the light emission component 3 from the air outflowing cavity 104. Therefore, the user can directly obtain information that the air treatment device 20 is currently in the operational state. Moreover, compared with when the first air outlet 2211 is opened by the air guide mechanism 60, the amount of light emitted by the light emission component 3 into the air outflowing cavity 104 is significantly reduced when the first air outlet 2211 is closed by the air guide mechanism 60. Therefore, the user can not only obtain information that the air treatment device 20 is currently in the operational state, but also obtain information that the first air outflowing opening 105 is currently closed by the air guide mechanism 60 and the first air outflowing opening 105 stops the air outflowing.

According to some exemplary embodiments of the present disclosure, referring to FIGS. 5 and 9 to 12, the accommodation chamber 231 extends in a circumferential direction of the first air outlet 2211, and the light emission component 3 may have a shape adapted to a shape of the accommodation chamber 231. The light emission component 3 extends in the circumferential direction of the first air outlet 2211, and the light-permeable member 232 may also extend in the circumferential direction of the first air outlet 2211. The light-permeable member 232 may have a circumferential extending length substantially consistent with a circumferential extending length of the light emission component 3, and therefore light emitted from different parts of the light emission component 3 may be emitted directly into the air outflowing cavity 104 through corresponding parts of the light-permeable member 232, respectively. The light-permeable member 232 may have a radial width smaller than a radial width of the light emission component 3. In this way, the light emitted by the light emission component 3 is emitted into the air outflowing cavity 104 through the narrow light-permeable member 232. Thus, the light emitted by the light-permeable member 232 is concentrated and has higher brightness. As a result, the user can more conveniently and intuitively see the boundary position of the first air outlet 2211. In addition, this setting also allows the light emission component 3 to represent a slender and strip-shaped light emission effect, resulting in a more aesthetically pleasing appearance.

According to some exemplary embodiments of the present disclosure, referring to FIGS. 5 and 9 to 12, the light-permeable member 232 may be disposed adjacent to an outer periphery of the first air outlet 2211, and therefore the light-permeable member 232 may better indicate the position of the first air outlet 2211. For example, the light-permeable member 232 may be in an annular shape, and the annular-shaped light-permeable member 232 may be formed as a periphery of the first air outlet 2211. Therefore, when the light emission component 3 operates, an entire periphery position of the first air outlet 2211 can be conveniently and intuitively obtained by seeing an annular-shaped light circle presented in the air outflowing cavity 104. Moreover, the appearance is more aesthetically pleasing.

In another exemplary embodiment of the present disclosure, the light emission component 3 may be in an annular shape extending in the circumferential direction of the first air outlet 2211, the accommodation chamber 231 may be in an annular shape extending in the circumferential direction of the first air outlet 2211, the light emission component 3 may be mounted into the accommodation chamber 231 in the circumferential direction of the accommodation chamber 231, and the light-permeable member 232 may also be in an annular shape extending in the circumferential direction of the first air outlet 2211, and the annular-shaped light-permeable member 232 may be formed as the periphery of the first air outlet 2211. Therefore, light of each part of the light-permeable member 232 is more uniform in a circumferential direction of the light-permeable member 232, and the annular-shaped light circle is also presented in the air outflowing cavity 104. Thus, the entire periphery position of the first air outlet 2211 can be conveniently and intuitively obtained. Moreover, the appearance is more aesthetically pleasing.

According to some exemplary embodiments of the present disclosure, referring to FIGS. 5 to 12, the air outflowing housing 2 may include a housing body 21, a fixation support 23, and an air outflowing member 22. A top of the housing body 21 may have a mounting opening. The air outflowing member 22 may be disposed at the mounting opening and may have the first air outlet 2211. The fixation support 23 is disposed at the air outflowing member 22 and located at the outer peripheral side of the first air outlet 2211. The fixation support 23 may be in an annular shape, and the annular-shaped fixation support 23 may surround the air outflowing member 22. The fixation support 23 is connected to the housing body 21, and therefore it is easy to connect the air outflowing member 22 to the housing body 21 by providing the fixation support 23. The accommodation chamber 231 may be formed between the fixation support 23 and the air outflowing member 22, and therefore formation of the accommodation chamber 231 and mounting of the light emission component 3 are facilitated by forming the accommodation chamber 231 between the fixation support 23 and the air outflowing member 22.

In some exemplary embodiments of the present disclosure, referring to FIGS. 5 to 12, the air outflowing member 22 may have an accommodation groove 2212 located at the outer peripheral side of the first air outlet 2211. The light emission component 3 is disposed in the accommodation groove 2212. The accommodation groove 2212 may extend in the circumferential direction of the first air outlet 2211. For example, the accommodation groove 2212 may be in an annular shape extending in the circumferential direction of the first air outlet 2211. The accommodation groove 2212 has a side opened towards the air outflowing cavity 104 to form an opening. The fixation support 23 may cover a part of the opening in a radial direction of the first air outlet 2211. The accommodation chamber 231 may be formed between an inner wall of the accommodation groove 2212 and the fixation support 23. An uncovered part of the opening may be formed as the light-permeable member 232. This arrangement makes it convenient to mount the light emission component 3, for example, the light emission component 3 is mounted in the accommodation groove 2212 before the fixation support 23 is mounted at the air outflowing member 22. Formation of the light-permeable member 232 can be facilitated by allowing the part of the opening of the accommodation groove 2212 that is not covered by the fixation support 23 to be formed as the light-permeable member 232. In this case, the light-permeable member 232 is formed as a light-permeable hole to allow the light-permeable member 232 to have a width in the radial direction of the first air outlet 2211 smaller than a width of the opening of the accommodation groove 2212 in the radial direction of the first air outlet 2211. Therefore, the light emitted by the light emission component 3 through the light-permeable member 232 is more concentrated. In this way, the light emission is realized through a narrow slit, which is more convenient for users to intuitively see and has a more aesthetically pleasing appearance.

According to some exemplary embodiments of the present disclosure, referring to FIGS. 9, 10, and 21 to 24, the light emission component 3 may be provided with a first engagement member 314. The first engagement member 314 may be formed at a side of the light emission component 3 facing away from the light-permeable member 232, and the wall of the accommodation chamber 231 may have a first engagement hole 2213 engaged with the first engagement member 314. For example, when the air outflowing member 22 of the air outflowing housing 2 is provided with an accommodation groove 2212 located at the outer peripheral side of the first air outlet 2211, and the light emission component 3 is disposed in the accommodation groove 2212, the inner wall of the accommodation groove 2212 may have a first engagement hole 2213. When the light emission component 3 is mounted in the accommodation chamber 231 or the accommodation groove 2212, the light emission component 3 can be conveniently mounted and fixed by allowing the first engagement member 314 at the light emission component 3 to be engaged with the first engagement hole 2213. Furthermore, the light emission component 3 can be conveniently detached from the accommodation chamber 231 to allow for easy replacement and maintenance of the light emission component 3.

In some exemplary embodiments of the present disclosure, referring to FIGS. 9, 10, and 21 to 24, the light emission component 3 is further provided with a positioning protrusion 315 formed at the side of the light emission component 3 facing away from the light-permeable member 232, and the wall of the accommodation chamber 231 has a positioning hole 2214 engaged with the positioning protrusion 315. When the light emission component 3 is mounted in the accommodation chamber 231 or the accommodation groove 2212, the positioning protrusion 315 at the light emission component 3 can be inserted into the positioning hole 2214 to allow the light emission component 3 to be preliminarily positioned in the accommodation chamber 231. In this case, it is indicated that the mounting position of the light emission component 3 is accurate, and the first engagement member 314 is engaged with the first engagement hole 2213. Thus, the light emission component 3 can be accurately and reliably mounted and fixed in the accommodation chamber 231.

According to some embodiments of the present disclosure, referring to FIGS. 21-24, the light emission component 3 may include a lamp socket 31, a light emission member 33, and a lamp cover 32. The lamp socket 31 may have a mounting recess 310. The light emission member 33 may be disposed in the mounting recess 310. The lamp socket 31 is opaque. The light emission member 33 may be a light emission band, and therefore the light emission member 33 is conveniently mounted and positioned by mounting the light emission member 33 in the mounting recess 310 of the lamp socket 31. The lamp cover 32 is transparent and covers an open end of the lamp socket 31. At least part of the lamp cover 32 is accommodated in the mounting recess 310. For example, a part of the lamp cover 32 may be accommodated in the mounting recess 310, or a whole lamp cover 32 may be accommodated in the mounting recess 310. When the light emission member 33 emits light, the light emitted by the light emission member 33 is emitted through the lamp cover 32. By arranging the light emission member 33 in a space formed by the lamp socket 31 and the lamp cover 32, it is not only convenient to mount and fix the light emission member 33, but also serves a function in protecting the light emission member 33.

According to some exemplary embodiments of the present disclosure, referring to FIGS. 21 to 24, the lamp cover 32 may be sealingly connected to the lamp socket 31 by a sealant. Therefore, seal performance of the connection between the lamp cover 32 and the lamp socket 31 can be further improved, which can better prevent external moisture or the like from entering the mounting recess 310 and affecting the light emission member 33.

For example, an outer peripheral wall of the lamp cover 32 may have a seal recess 321 configured to accommodate the sealant. The sealant is accommodated in the seal recess 321, which facilitates the arrangement of the sealant while ensuring the sealing performance of the connection between the lamp cover 32 and the lamp socket 31.

According to some exemplary embodiments of the present disclosure, referring to FIGS. 21 to 24, an inner peripheral wall of the mounting recess 310 may have a first limit surface 311, and the lamp cover 32 may abut with the first limit surface 311. By forming the first limit surface 311 at the inner peripheral wall of the mounting recess 310 and allowing the lamp cover 32 to abut with the first limit surface 311, it is convenient to mount the lamp cover 32 in the mounting recess 310. When the lamp cover 32 is mounted to the lamp socket 31, by allowing at least part of the lamp cover 32 to extend into the mounting recess 310 of the lamp socket 31, the lamp cover 32 cannot move further in the mounting recess 310 when the lamp cover 32 abuts with the first limit surface 311 in the mounting recess 310, indicating that the lamp cover 32 is mounted in place.

In some exemplary embodiments of the present disclosure, referring to FIGS. 21 to 24, the lamp cover 32 is provided with a press protrusion 322 formed at a side of the lamp cover 32 adjacent to the light emission member 33. When the lamp cover 32 is mounted to the lamp socket 31, the press protrusion 322 at the lamp cover 32 may abut against the light emission member 33. Therefore, the light emission member 33 can be prevented from moving or shaking in the mounting recess 310 by pressing the press protrusion 322 at the lamp cover 32 into the mounting recess 310 of the lamp socket 31 through the light emission member 33. Therefore, the light emission member 33 can be more stably mounted and fixed in the mounting recess 310 of the lamp socket 31.

In another exemplary embodiment of the present disclosure, the lamp cover 32 may be provided with a plurality of press protrusions 322 that may be arranged at intervals in an extending direction of the lamp cover 32, and the extending direction of the lamp cover 32 is consistent with an extending direction of the light emission member 33. The light emission member 33 can be uniformly and stably pressed by providing a plurality of press protrusions 322. Therefore, the light emitting member is more stably mounted in the mounting recess 310 of the lamp socket 31.

According to some exemplary embodiments of the present disclosure, referring to FIGS. 21 to 24, the light emission component 3 may further include a light guide hood 34 that may be connected to the lamp socket 31 and may cover the lamp cover 32. The light emitted by the light emission member 33 passes through the lamp cover 32 and then is uniformly guided by the light guide hood 34, resulting in more uniform light emission of the light emission member 33. One of the light guide hood 34 and the lamp socket 31 is provided with a second engagement member 316 and the other one of the light guide hood 34 and the lamp socket 31 has a second engagement hole 341 engaged with the second engagement member 316. For example, the second engagement member 316 is formed at the light guide hood 34 and the second engagement hole 341 is formed at the lamp socket 31; or the second engagement hole 341 is formed at the light guide hood 34 and the second engagement member 316 is formed at the lamp socket 31. When the light guide hood 34 is mounted at the lamp socket 31, by engaging the second engagement member 316 with the second engagement hole 341, the light guide hood 34 can be easily mounted at the lamp socket 31, and detachment and mounting of the light guide hood 34, as well as replacement and maintenance of the light guide hood 34, are facilitated.

In some exemplary embodiments of the present disclosure, referring to FIGS. 21 to 24, each of the lamp socket 31, the lamp cover 32, and the light guide hood 34 is in an annular shape, and the light emission member 33 may be in an open annular shape. An inner peripheral wall of the lamp socket 31 may be provided with a plurality of second engagement members 316 that may be arranged at intervals in a circumferential direction of the lamp socket 31. Moreover, an outer peripheral wall of the lamp socket 31 may be provided with a second engagement member 316. The outer peripheral wall of the lamp socket 31 may be provided with a plurality of second engagement members 316 that may be arranged at intervals in the circumferential direction of the lamp socket 31. An inner peripheral wall of the light guide hood 34 may have a second engagement hole 341. The inner peripheral wall of the light guide hood 34 may have a plurality of second engagement holes 341 that may be arranged at intervals in a circumferential direction of the light guide hood 34. Moreover, an outer peripheral wall of the light guide hood 34 may be provided with a second engagement hole 341. The outer peripheral wall of the light guide hood 34 may be provided with a plurality of second engagement holes 341 that may be arranged at intervals in the circumferential direction of the light guide hood 34.

When the light guide hood 34 is mounted at the lamp socket 31, the second engagement member 316 located at the inner peripheral wall of the lamp socket 31 is engaged with the second engagement hole 341 located at the inner peripheral wall of the light guide hood 34, and the second engagement member 316 located at the outer peripheral wall of the lamp socket 31 is engaged with the second engagement hole 341 located at the outer peripheral wall of the light guide hood 34. Therefore, it is easy to connect the light guide hood 34 to the lamp socket 31.

Further, referring to FIGS. 21 to 24, an inner peripheral wall of the lamp socket 31 may have a second limit surface 312 that may extend in the circumferential direction of the lamp socket 31; and the outer peripheral wall of the lamp socket 31 may have a third limit surface 313 that may extend in the circumferential direction of the lamp socket 31. When the light guide hood 34 is fitted and connected to the lamp socket 31, the inner peripheral wall of the light guide hood 34 abuts with the second limit surface 312, and the outer peripheral wall of the light guide hood 34 abuts with the third limit surface 313. It is indicated that the light guide hood 34 is mounted in place, and each second engagement member 316 is engaged with the second engagement hole 341. Therefore, the fitting and connection of the light guide hood 34 to the lamp socket 31 can be further facilitated.

According to some embodiments of the present disclosure, referring to FIGS. 10 to 20, an air conditioner includes an air guide mechanism 60 and a drive assembly 70. The air guide mechanism 60 is movably disposed in the casing 10 to open or close the first air outlet 2211. The first air outlet 2211 can be easily opened or closed by moving the air guide mechanism 60. For example, the air guide mechanism 60 may be movably disposed in the casing 10 in an up-down direction, and the first air outlet 2211 may be opened or closed by moving the air guide mechanism 60 up and down. The drive assembly 70 includes a drive mechanism 71 and a drive member 72 disposed at the air guide mechanism 60. The drive mechanism 71 is engaged with the drive member 72 in a transmission manner to drive the air guide mechanism 60 to move up and down, and therefore it is easy to drive and control the air guide mechanism 60 to move up and down.

When the first air outlet 2211 is opened by the air guide mechanism 60, the first air outlet 2211 is in communication with the first air outflowing opening 105, and air introduced into the air duct of the air treatment device 20 from the air inlet 411 flows out of the air treatment device 20 through the first air outlet 2211, and is blown out indoors through the first air outflowing opening 105. Therefore, the indoor environmental quality is improved and adjusted. When the first air outlet 2211 is closed by the air guide mechanism 60, the first air outlet 2211 is isolated from the first air outflowing opening 105, and the first air outflowing opening 105 is no longer blown out the air. Therefore, the air outflowing of the first air outflowing opening 105 can be easily controlled to allow for the communication and isolation between the first air outlet 2211 and the first air outflowing opening 105. Thus, the improvement of the indoor air quality can be easily controlled to satisfy the higher demands of the user.

Referring to FIGS. 12 to 15, the air guide mechanism 60 may include an air guide mechanism body **6*a* and a decoration cover 6*c* covering at a top of the air guide mechanism body 6*a*. A structural strength of the air guide mechanism 60 can be improved by configuring the air guide mechanism 60 to be the air guide mechanism body 6*a* and the decoration cover 6*c*, and the air guide mechanism 60 can have a more aesthetically pleasing appearance by designing the decoration cover 6*c*. Further, the air guide mechanism body 6*a* may include a first air guide member 61 and a second air guide member 62 connected to each other in a horizontal direction. For example, the air guide mechanism body 6*a* may include a first air guide member 61 and a second air guide member 62 connected to each other in a front-rear direction. Each of the first air guide member 61 and the second air guide member 62 is an independent molded member. Each of the first air guide member 61 and the second air guide member 62 is independently molded and then fitted. In this way, a difficulty of processing and molding of the air guide mechanism body 6*a* can be reduced. For example, when molding with a mold, complexity of the mold can be reduced, and cost of the mold is thus reduced. In addition, the quality of processing and molding of the air guide mechanism body 6*a*** can be ensured.

The decoration cover **6*c*, the first air guide member 61, and the second air guide member 62 may serve as an appearance of the air guide mechanism 60, and an outer surface of each of the decoration cover 6*c*, the first air guide member 61, and the second air guide member 62 may be processed, such as plating, spray painting, etc., to allow the air guide mechanism 60** to have a diversified and more aesthetically pleasing appearance.

According to some embodiments of the present disclosure, referring to FIGS. 1 to 20, the air outflowing cavity 104 is formed in the casing 10 and may be located approximately in a middle part of the casing 10, and the first air outflowing opening 105 may be formed at the front side wall of the air outflowing cavity 104. When the first air outlet 2211 is opened by the air guide mechanism 60, the first air outlet 2211 may be in communication with the first air outflowing opening 105 through the air outflowing cavity 104. When the air treatment device 20 operates, air introduced from the air inlet 411 into the air treatment device 20 flows out of the air treatment device 20 from the first air outlet 2211, flows into the air outflowing cavity 104 in the casing 10, and then is blown out indoors through the first air outflowing opening 105.

When the first air outlet 2211 is opened by the air guide mechanism 60, the decoration cover **6*c* and at least part of the air guide mechanism body 6*a* are located in the air outflowing cavity 104, for example, the decoration cover 6*c* and a part of the air guide mechanism body 6*a* are located in the air outflowing cavity 104, or the decoration cover 6*c* and the air guide mechanism body 6*a* are located in the air outflowing cavity 104. The part of the air guide mechanism body 6*a* located in the air outflowing cavity 104 has an airflow channel extending through the air guide mechanism body 6*a* in a front-rear direction. In this way, a part of airflow flowing into the air outflowing cavity 104 from the first air outlet 2211 of the air treatment device 20 can flow to the first air outflowing opening 105 through a space between the air guide mechanism 60 and the inner wall of the air outflowing cavity 104, and another part can flow to the first air outflowing opening 105 through the airflow channel at the air guide mechanism 60. In this way, resistance of the airflow flowing into the air outflowing cavity 104 towards the first air outflowing opening 105 can be reduced. As a result, the air outflowing is smoother, and the air outflowing of the first air outflowing opening 105** as a whole is more uniform.

According to some exemplary embodiments of the present disclosure, referring to FIGS. 14, 15, 19, and 20, the first air guide member 61 may be butt-jointed to the second air guide member 62 in the front-rear direction, for example, the first air guide member 61 may be connected to a front side of the second air guide member 62. The airflow channel includes a first airflow channel 610 formed in the first air guide member 61 and a second airflow channel 620 formed in the second air guide member 62. Both front and rear sides of the first airflow channel 610 are open, and both front and rear sides of the second airflow channel 620 are open. When the first air guide member 61 is butt-jointed to the second air guide member 62 in the front-rear direction, the rear side of the first airflow channel 610 is butt-jointed to and in communication with the front side of the second airflow channel 620. In this way, when the first air guide member 61 is connected and fitted to the second air guide member 62 to be configured as the air guide mechanism body 6*a*, the first airflow channel 610 in the first air guide member 61 is in communication with the second airflow channel 620 in the second air guide member 62 to form the above-mentioned total airflow channel. Through the butt-joint between the first air guide member 61 and the second air guide member 62 in the front-rear direction, it is easy to connect the first air guide member 61 to the second air guide member 62, and the connection between the first air guide member 61 and the second air guide member 62 has less influence on the air flow.

Further, since the air guide mechanism body 6*a* has such a cavity structure as the airflow channel, the difficulty of processing and molding of the air guide mechanism body 6*a* can be reduced by providing the air guide mechanism body 6*a* with the first air guide member 61 and the second air guide member 62 that are independently molded. For example, when the air guide mechanism 60 is provided with the first air guide member 61 and the second air guide member 62 that are butt-jointed to each other in the front-rear direction, the cavity structure in the air guide mechanism body 6*a* is divided into two parts (i.e., the first airflow channel 610 and the second airflow channel 620), and the two parts are formed in the first air guide member 61 and the second air guide member 62, respectively. In this way, process difficulty of forming the cavity structure in the air guide mechanism body 6*a* can be reduced.

According to some exemplary embodiments of the present disclosure, referring to FIGS. 12 to 15, 19, and 20, the air guide mechanism body 6*a* may be detachably connected to the decoration cover 6*c*, and the drive member 72 is disposed at the air guide mechanism body 6*a*. The air guide mechanism body 6*a* or the decoration cover 6*c* can be easily replaced by detachably connecting the air guide mechanism body 6*a* to the decoration cover 6*c*. Moreover, by providing the drive member 72 at the air guide mechanism body 6*a*, the air guide mechanism 60 can look more aesthetically pleasing in terms of appearance layout, and maintenance of the drive member 72 can be facilitated.

According to some exemplary embodiments of the present disclosure, referring to FIGS. 12 to 15, 19, and 20, the first air guide member 61 may be detachably connected to the second air guide member 62, and the drive member 72 may be disposed at one of the first air guide member 61 and the second air guide member 62. For example, the drive member 72 may be disposed at the first air guide member 61 or the drive member 72 may be disposed at the second air guide member 62. By detachably connecting the first air guide member 61 to the second air guide member 62, it is convenient to replace the first air guide member 61 or the second air guide member 62. For example, the drive member 72 is disposed at the first air guide member 61 or the second air guide member 62, when the drive member 72 is damaged or needs maintenance, the first air guide member 61 or the second air guide member 62 provided with the drive member 72 can be detached for replacement or maintenance, without detaching the entire air guide mechanism 60.

Figure 19:
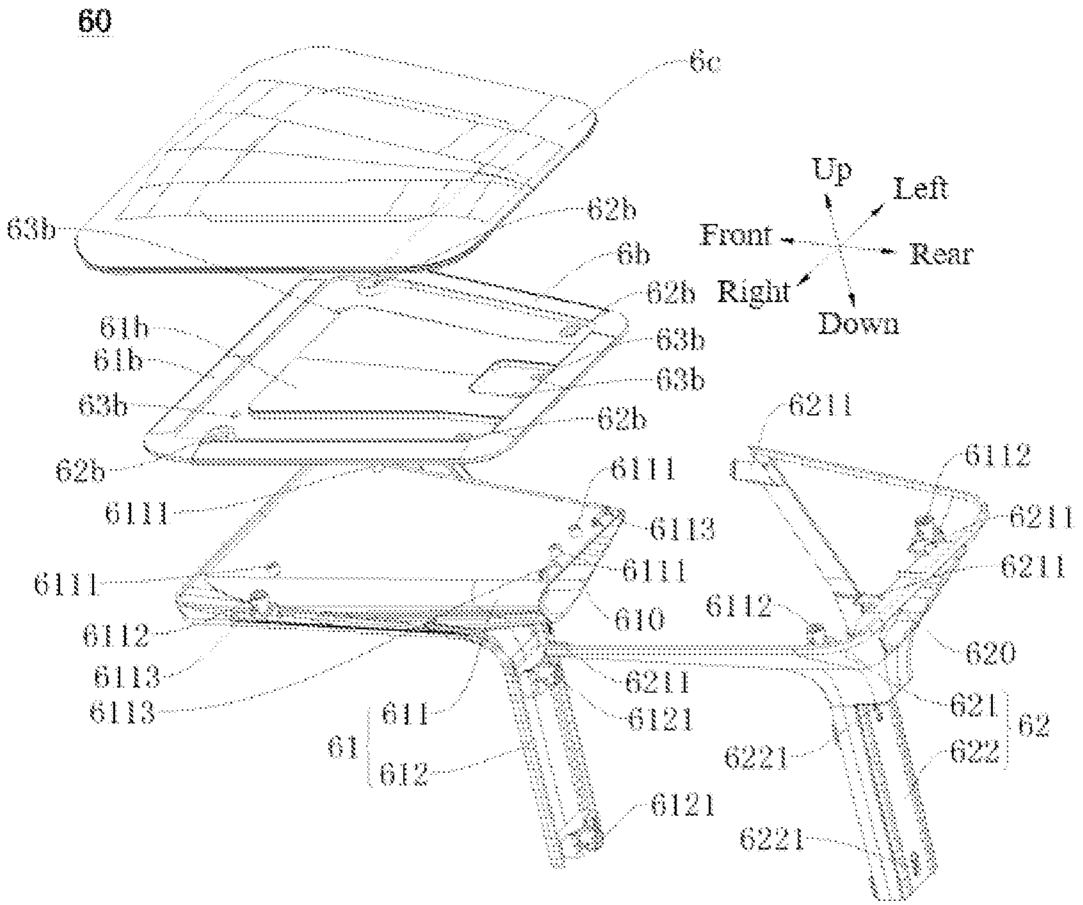
FIG. 19 is an exploded view of the air guide mechanism of the air treatment device of FIG. 12.

In another exemplary embodiment of the present disclosure, referring to FIG. 19, one of the first air guide member 61 and the second air guide member 62 is provided with a third engagement member 6211, and the other one of the first air guide member 61 and the second air guide member 62 has a third engagement hole 6113 engaged with the third engagement member 6211. For example, when the third engagement member 6211 is formed at the first air guide member 61, the third engagement hole 6113 is formed at the second air guide member 62; and when the third engagement hole 6113 is formed at the first air guide member 61, the third engagement member 6211 is formed at the second air guide member 62. When the first air guide member 61 is fitted to the second air guide member 62, the first air guide member 61 and the second air guide member 62 can be easily connected and fitted to each other by engaging the third engagement member 6211 with the third engagement hole 6113. In addition, detachment between the first air guide member 61 and the second air guide member 62 is also facilitated.

Figure 14:
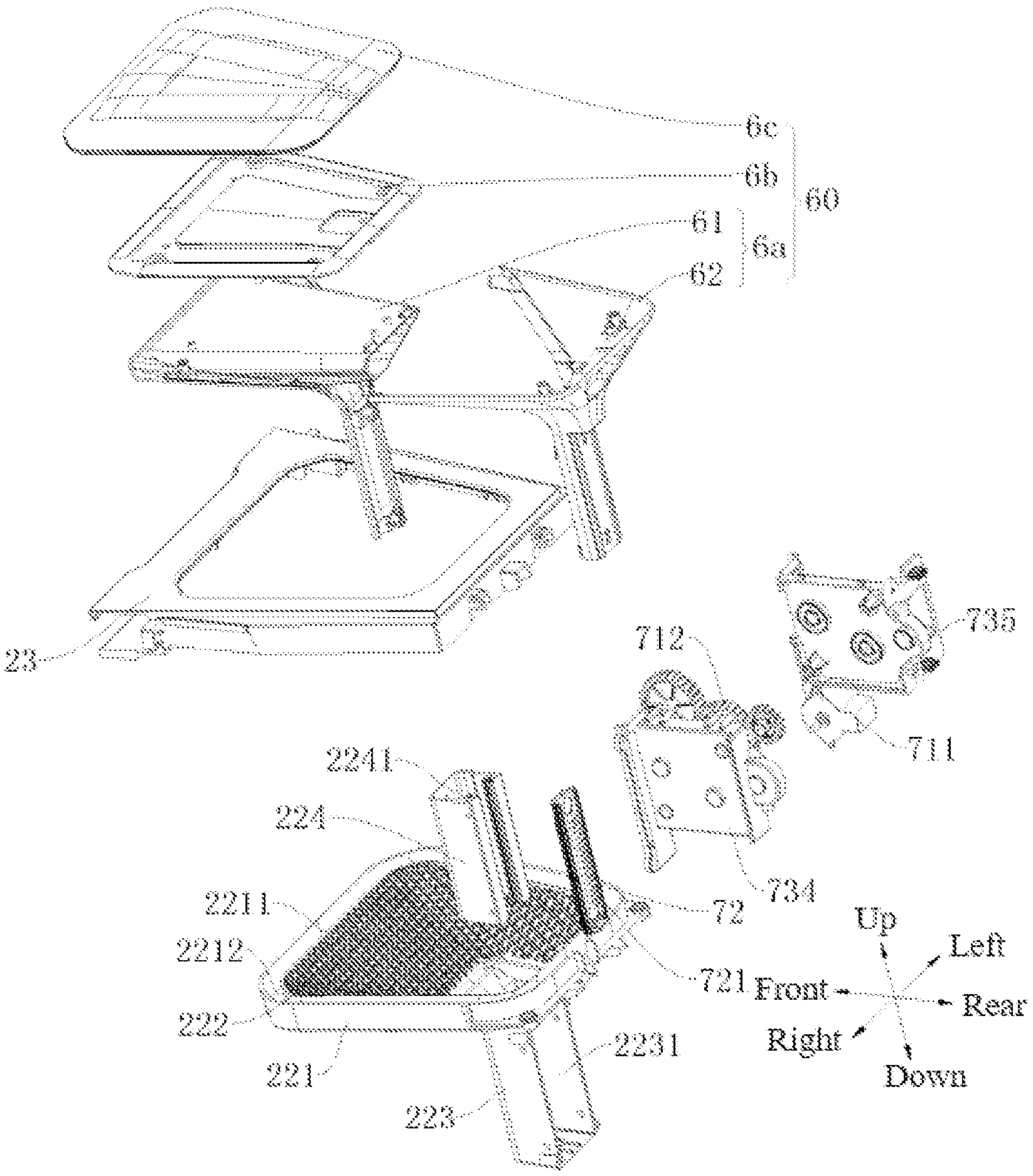
FIG. 14 is an exploded view of the partial structure of the air treatment device and the air guide mechanism of FIG. 12.
Figure 15:
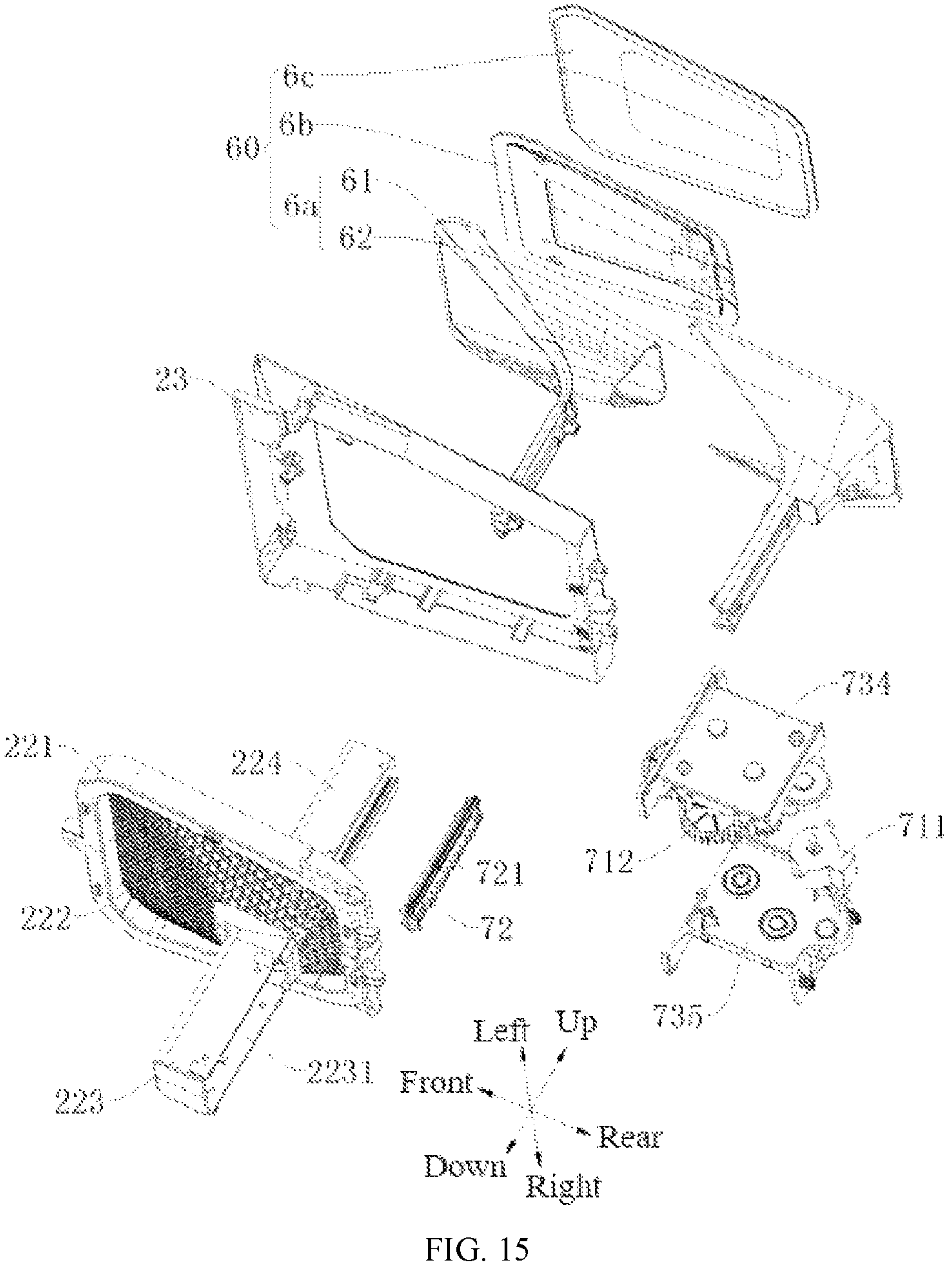
FIG. 15 is another exploded view of the partial structure of the air treatment device and the air guide mechanism of FIG. 12.
Figure 16:
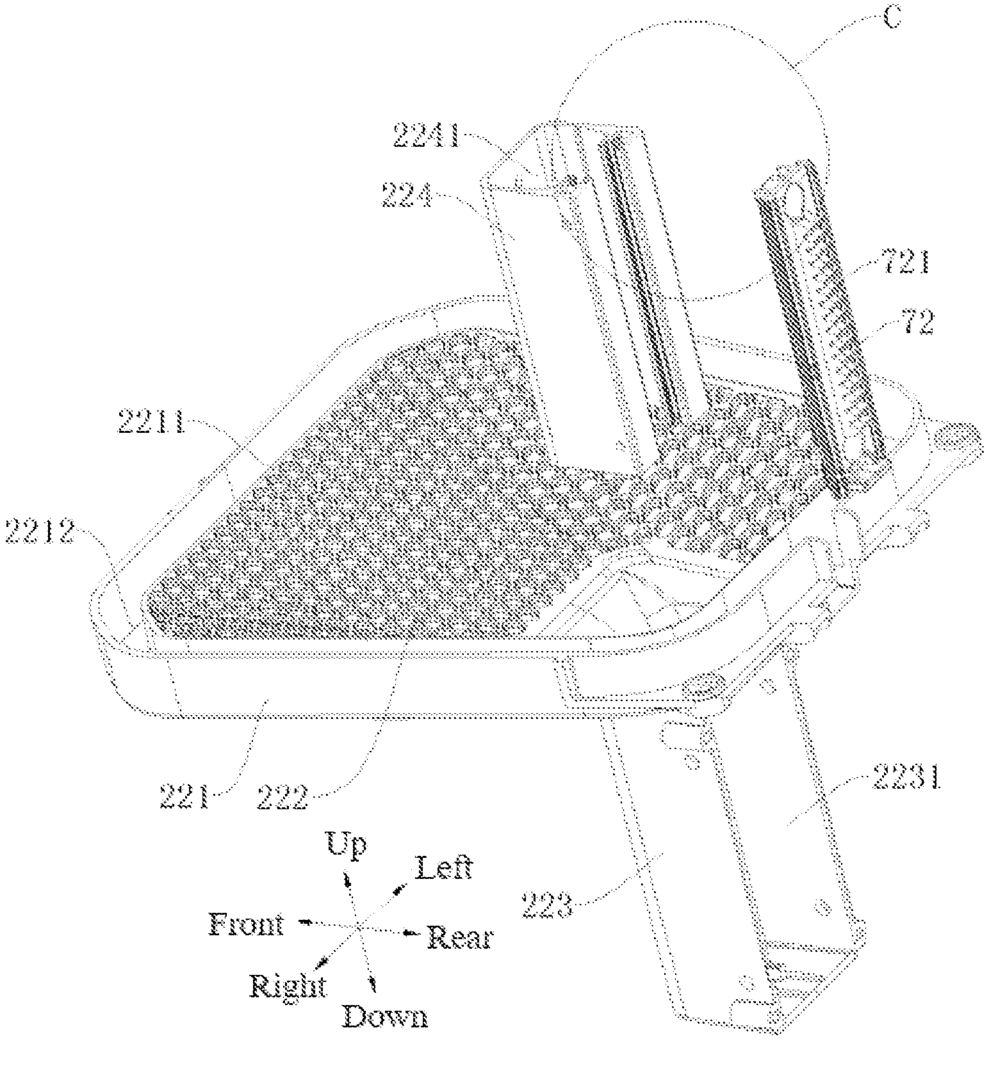
FIG. 16 is an exploded view of an air outflowing member of the air treatment device and a drive member of FIG. 12.
Figure 17:
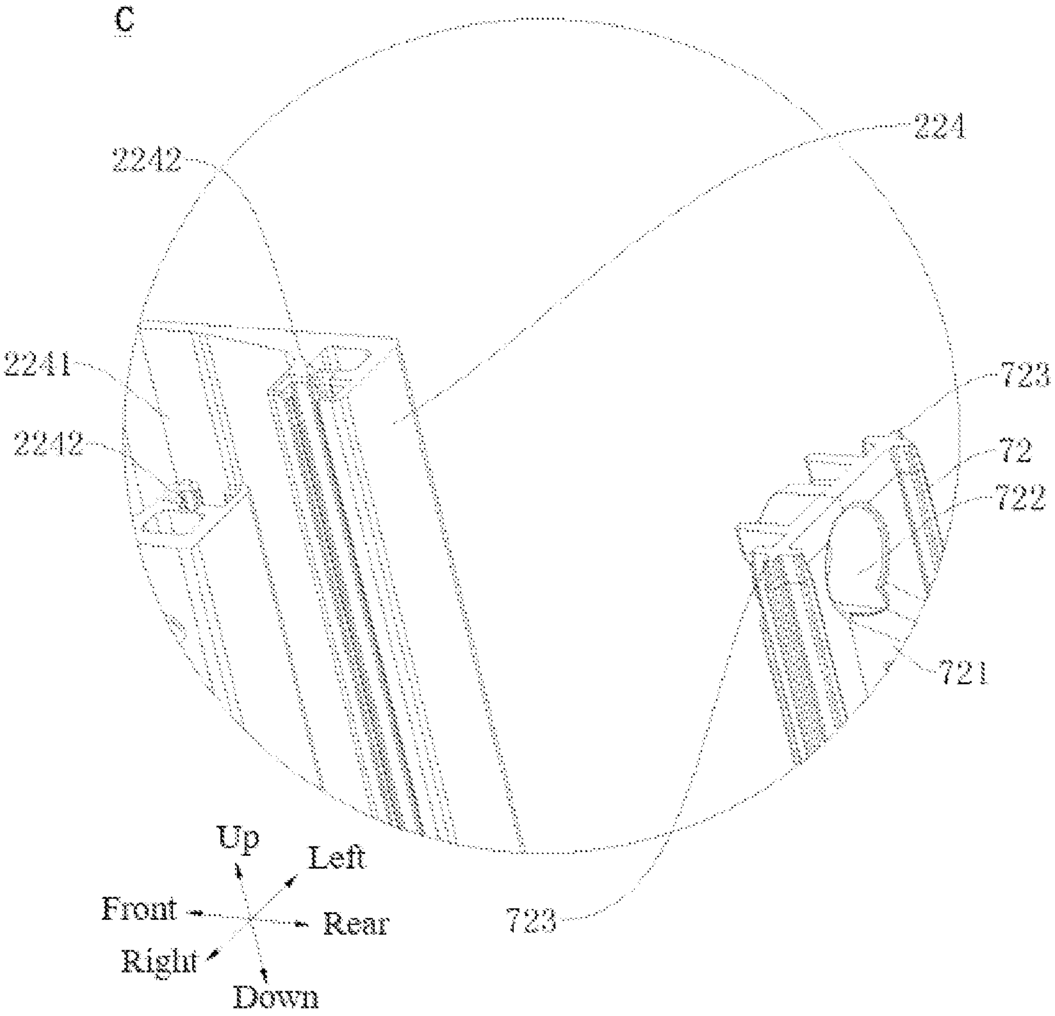
FIG. 17 is an enlarged view at a position C in FIG. 16.
Figure 18:
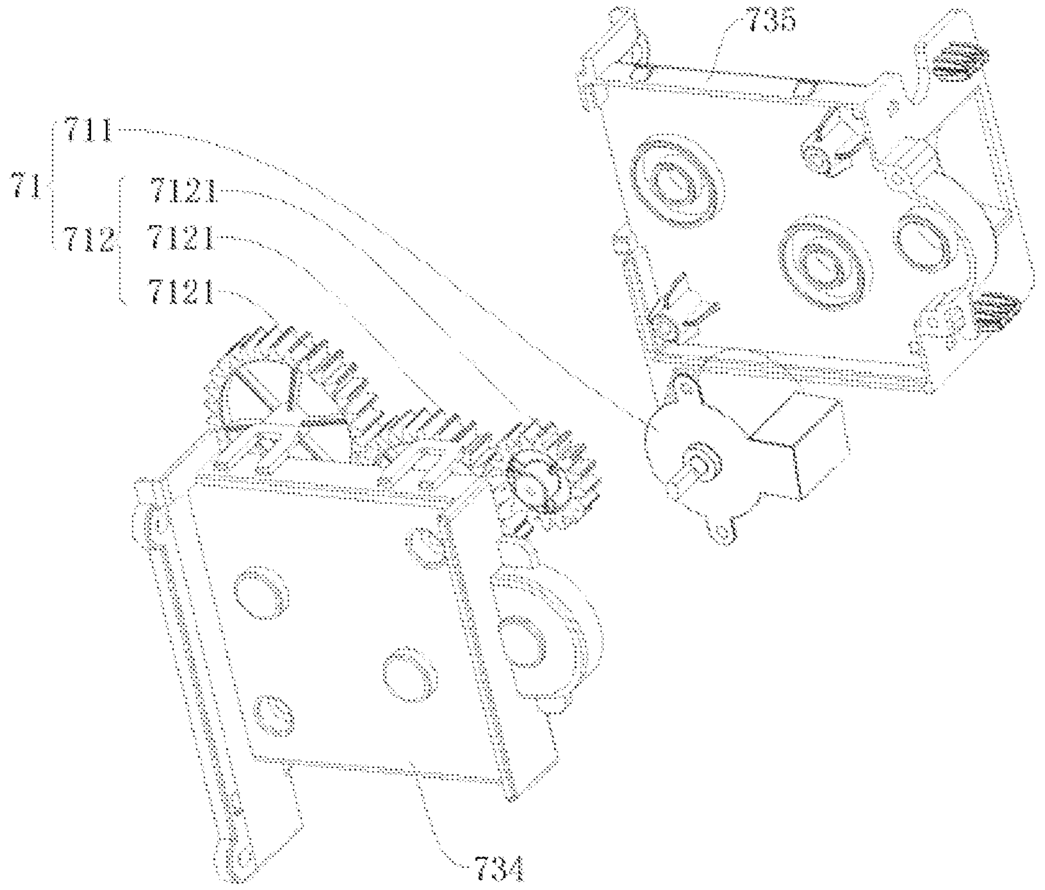
FIG. 18 is a partial structural exploded view of a drive assembly of the air treatment device of FIG. 12.

According to some embodiments of the present disclosure, referring to FIGS. 14, 15, and 19, the air guide mechanism 60 further includes a liner plate 6*b* disposed between the air guide mechanism body 6*a* and the decoration cover 6*c*. The overall structural strength of the air guide mechanism 60 can be strengthened by providing the liner plate 6*b*. Therefore, the air guide mechanism 60 is more stable during the movement. In this way, the service life of the air guide mechanism 60 can be prolonged.

According to some exemplary embodiments of the present disclosure, referring to FIGS. 14, 15, and 19, the liner plate 6*b* is detachably connected to the air guide mechanism body 6*a*, the decoration cover 6*c* is connected to the liner plate 6*b* by an adhesive layer, and the adhesive layer may be a double-sided adhesive layer. Since the decoration cover 6*c* is connected to the liner plate 6*b* by the adhesive layer, the decoration cover 6*c* can be easily connected to the liner plate 6*b*, and the liner plate 6*b* and the decoration cover 6*c* can be formed into a whole. Since the liner plate 6*b* is detachably connected to the air guide mechanism body 6*a*, mounting and dismounting of the decoration cover 6*c* and the air guide mechanism body 6*a* can be facilitated.

In some exemplary embodiments of the present disclosure, referring to FIGS. 14, 15, and 19, at least a middle part of the liner plate 6*b* protrudes upwards to form a protrusion 61*b*. For example, a middle part of the liner plate 6*b* may protrude upwards to form a protrusion 61*b*, or a middle part of the liner plate 6*b* and a part close to an outer periphery of the liner plate 6*b* may both protrude upwards to form the protrusion 61*b*, and the adhesive layer is disposed at the protrusion 61*b*. The adhesive layer is easily arranged by forming the protrusion 61*b* at the liner plate 6*b*, and therefore the adhesive connection between the liner plate 6*b* and the decoration cover 6*c* is facilitated. Further, a structural strength of the liner plate 6*b* can be improved by forming the protrusion 61*b* at the liner plate 6*b*, and therefore the overall structural strength of the air guide mechanism 60 can be improved.

In some exemplary embodiments of the present disclosure, referring to FIG. 19, the liner plate 6*b* has a limit hole 63*b* and a first fixation hole 62*b*, the air guide mechanism body 6*a* has a second fixation hole 6112 corresponding to the first fixation hole 62*b* and is provided with a limit protrusion 6111 engaged with the limit hole 62*b*, and a first fastener passes through the first fixation hole 62*b* and the second fixation hole 6112. When the liner plate 6*b* is connected to the air guide mechanism body 6*a*, the first fixation hole 62*b* at the liner plate 6*b* may correspond to the second fixation hole 6112 at the air guide mechanism body 6*a*, and meanwhile, the limit protrusion 6111 at the air guide mechanism body 6*a* may be inserted into the limit hole 62*b* at the liner plate 6*b*. In this way, the fitting between the liner plate 6*b* and the air guide mechanism body 6*a* may be preliminarily positioned. Then, a fastener such as screw passes through the first fixation hole 62*b* and the second fixation hole 6112. Thus, the liner plate 6*b* can be reliably connected to the air guide mechanism body 6*a*.

According to some embodiments of the present disclosure, referring to FIGS. 12 to 20, the first air guide member 61 includes a first air guide part 611 and a first movable part 612, the first movable part 612 may be connected below the first air guide part 611, and the first air guide member 61 may be an integrally molded member. The second air guide member 62 includes a second air guide part 621 and a second movable part 622, the second movable part 622 is connected below the second air guide part 621, and the second air guide member 62 is an integrally molded member. When the first air guide member 61 is butt-jointed to the second air guide member 62, the first air guide part 611 is butt-jointed to the second air guide part 621, and the first movable part 612 is butt-jointed to the second movable part 622.

A butt-joint line between the first air guide part 611 and the second air guide part 621 surrounds the first air guide part 611, and therefore the fitting is convenient, and a length of the butt-joint line of the first air guide part 611 and the second air guide part 621 may be longer. In this way, reliability of connection between the first air guide part 611 and the second air guide part 621 is improved. The butt-joint line between the first movable part 612 and the second movable part 622 extends in the up-down direction to facilitate the connection and fitting of the first movable part 612 and the second movable part 622. The drive member 72 may be disposed at one of first movable part 612 and second movable part 622, for example, the drive member 72 may be disposed at the second movable part 622. The first air guide member 61 may be located in front of the second air guide member 62. The drive assembly 70 can be prevented from being seen in appearance by providing the drive member 7 on the second movable part 622 to drive the air guide mechanism 60 to move up and down. In this way, not only the overall aesthetic appearance can be improved, but also an influence of external dust or the like on the part of the drive assembly 70 provided at the second movable part 622 can be reduced.

Figure 20:
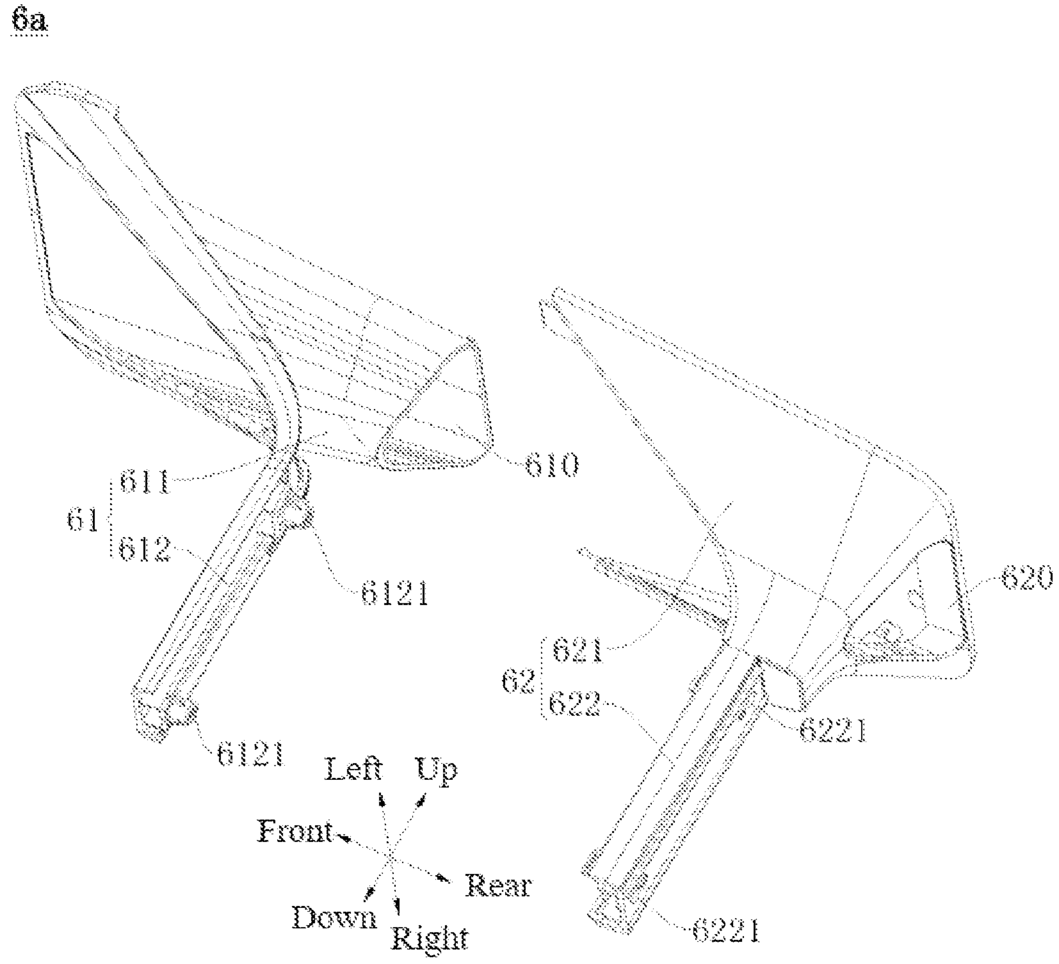
FIG. 20 is an exploded view of an air guide mechanism body of the air treatment device of FIG. 12.
Figure 21:
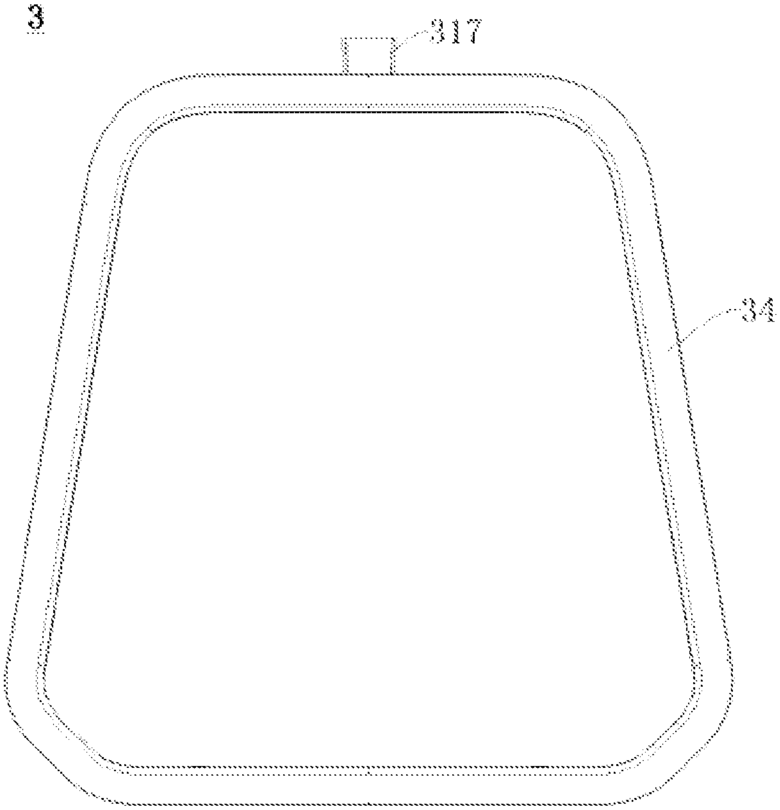
FIG. 21 is a front view of a light emission component of the air conditioner indoor unit of FIG. 1.
Figure 22:
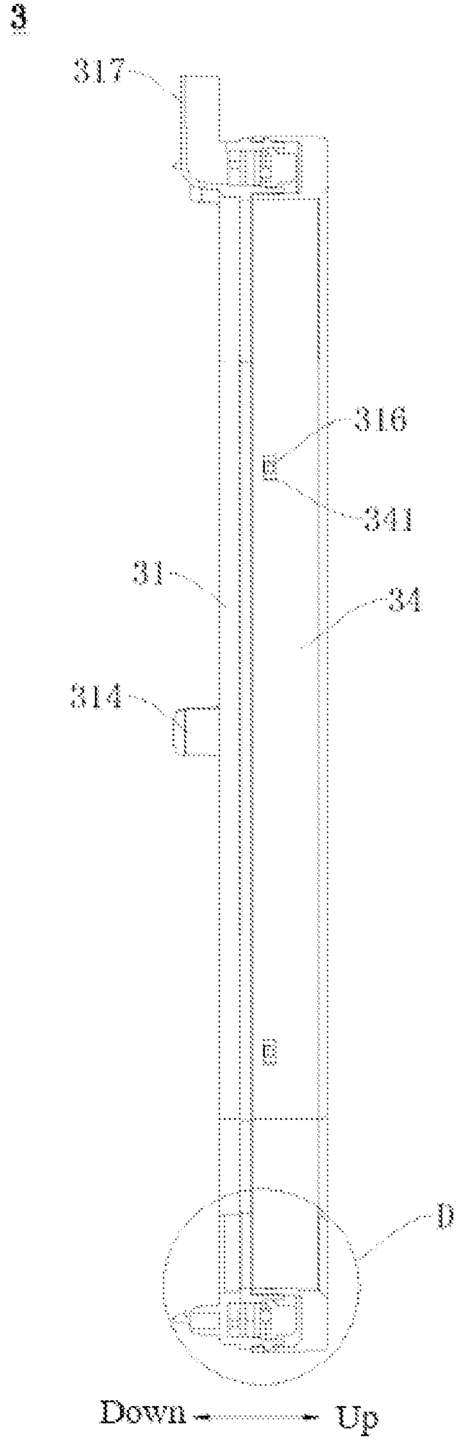
FIG. 22 is a side view of the light emission component of FIG. 21.
Figure 23:
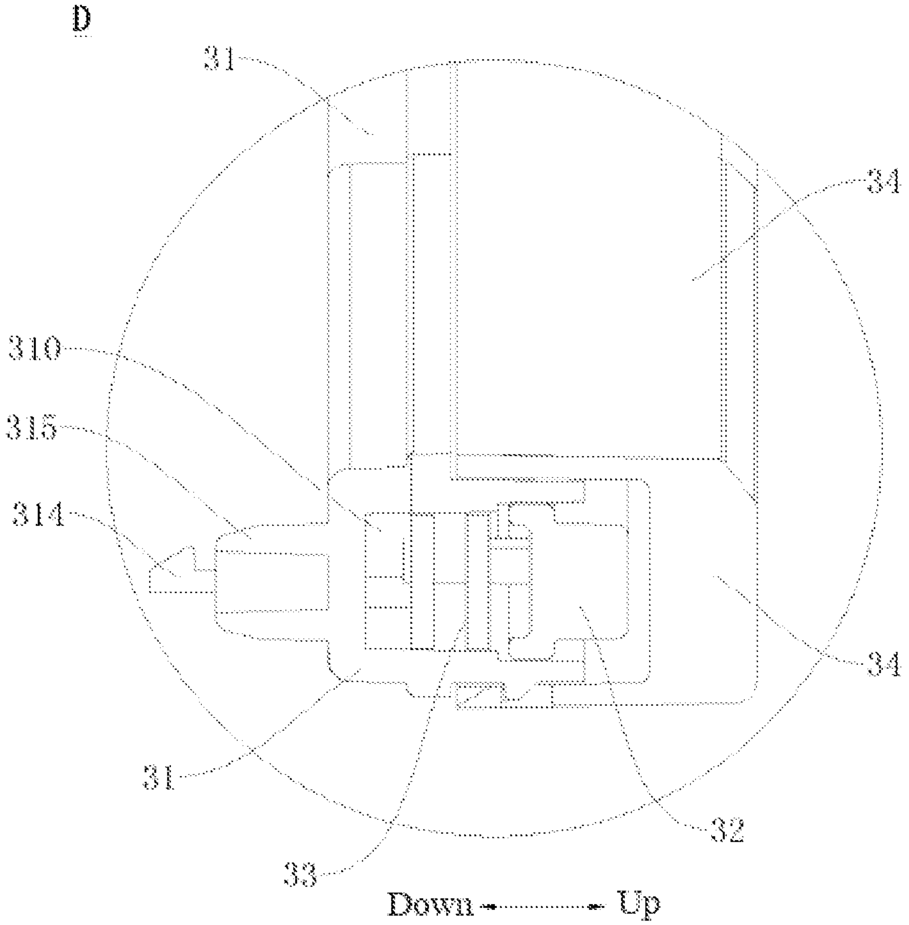
FIG. 23 is an enlarged view at a position D in FIG. 22.
Figure 24:
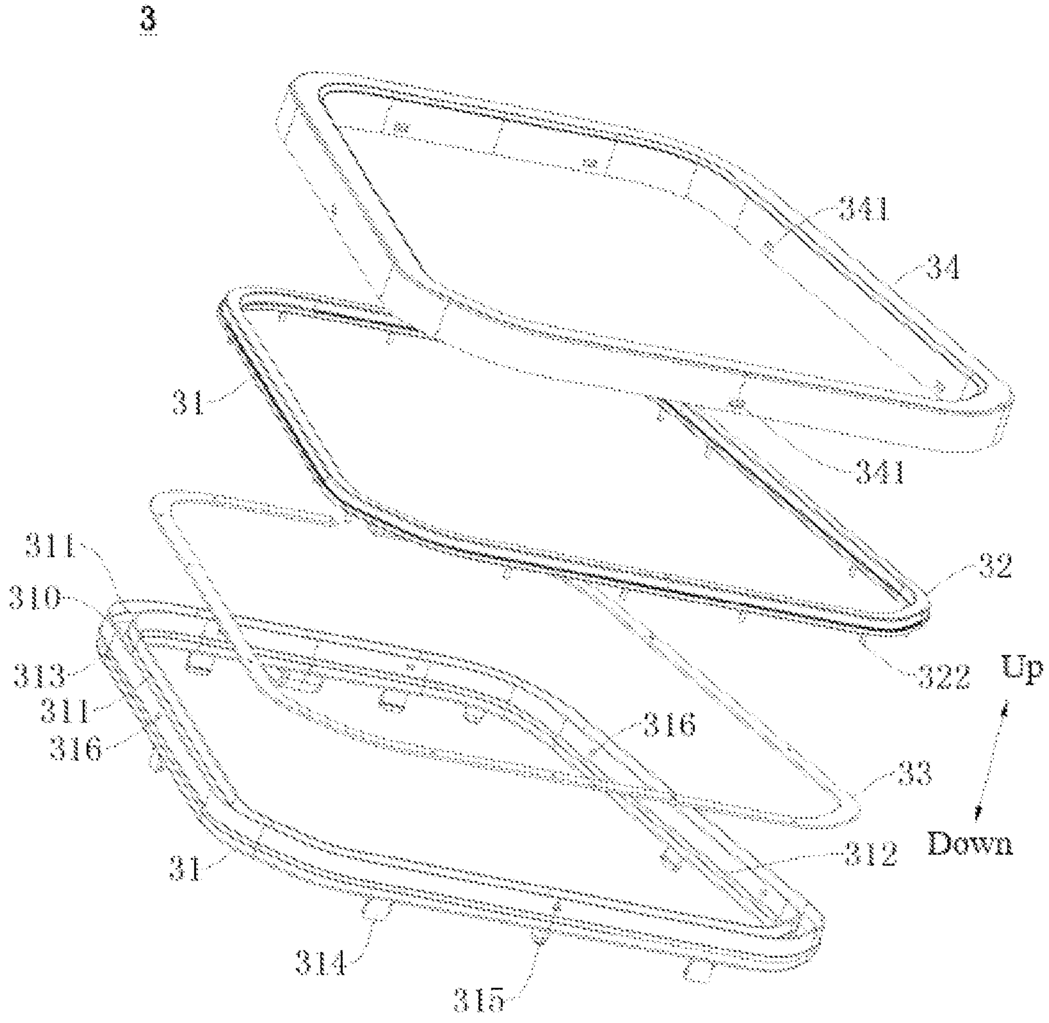
FIG. 24 is an exploded view of the light emission component of FIG. 21.
Figure 25:
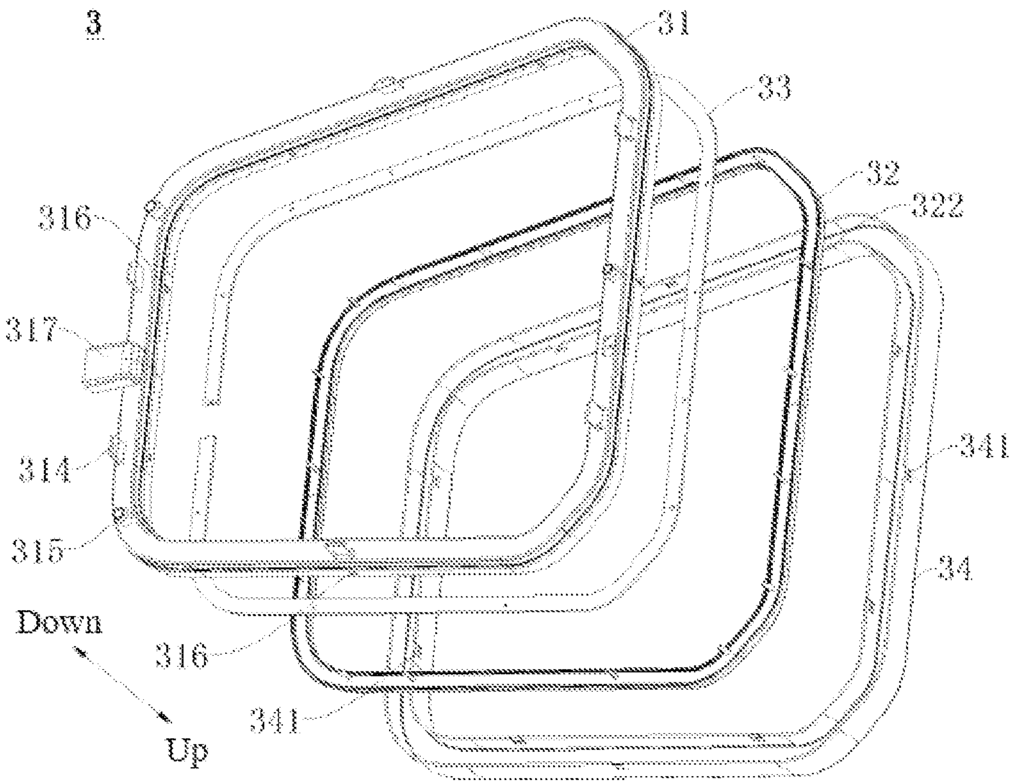
FIG. 25 is another exploded view of the light emission component of FIG. 21.

In some exemplary embodiments of the present disclosure, referring to FIGS. 19 and 20, the butt-joint line between the first air guide part 611 and the second air guide part 621 may have a length greater than half of a circumference of the first air guide part 611. Thus, the length of the butt-joint line between the first air guide part 611 and the second air guide part 621 can be longer. As a result, a connection strength between the first air guide part 611 and the second air guide part 621 is higher and the connection is reliable.

In some exemplary embodiments of the present application, referring to FIGS. 13 to 20, the drive member 72 may be disposed at a side of the second movable part 622 facing away from the first movable part 612, and the drive mechanism 71 is engaged with the drive member 72 in a transmission manner to drive the air guide mechanism 60 to move up and down. Therefore, the drive assembly 70 can easily drive the air guide mechanism 60 to move up and down. The first movable part 612 has a third fixation hole 6121. The second movable part 622 has a fourth fixation hole 6221. The drive member 72 has a fifth fixation hole 722. A second fastener passes through the fifth fixation hole 722, the fourth fixation hole 6221, and the third fixation hole 6121. When the first air guide member 61, the second air guide member 62, and the drive member 72 are fitted, the drive member 72 can be fitted to the second movable part 622 by passing fasteners through the fifth fixation hole 722 of the drive member 72, the fourth fixation hole 6221 of the second movable part 622, and the third fixation hole 6121 of the first movable part 612. At the same time, the first movable part 612 is connected to the second movable part 622. In this way, fitting procedures are reduced with an increase in fitting efficiency.

Figure 9:
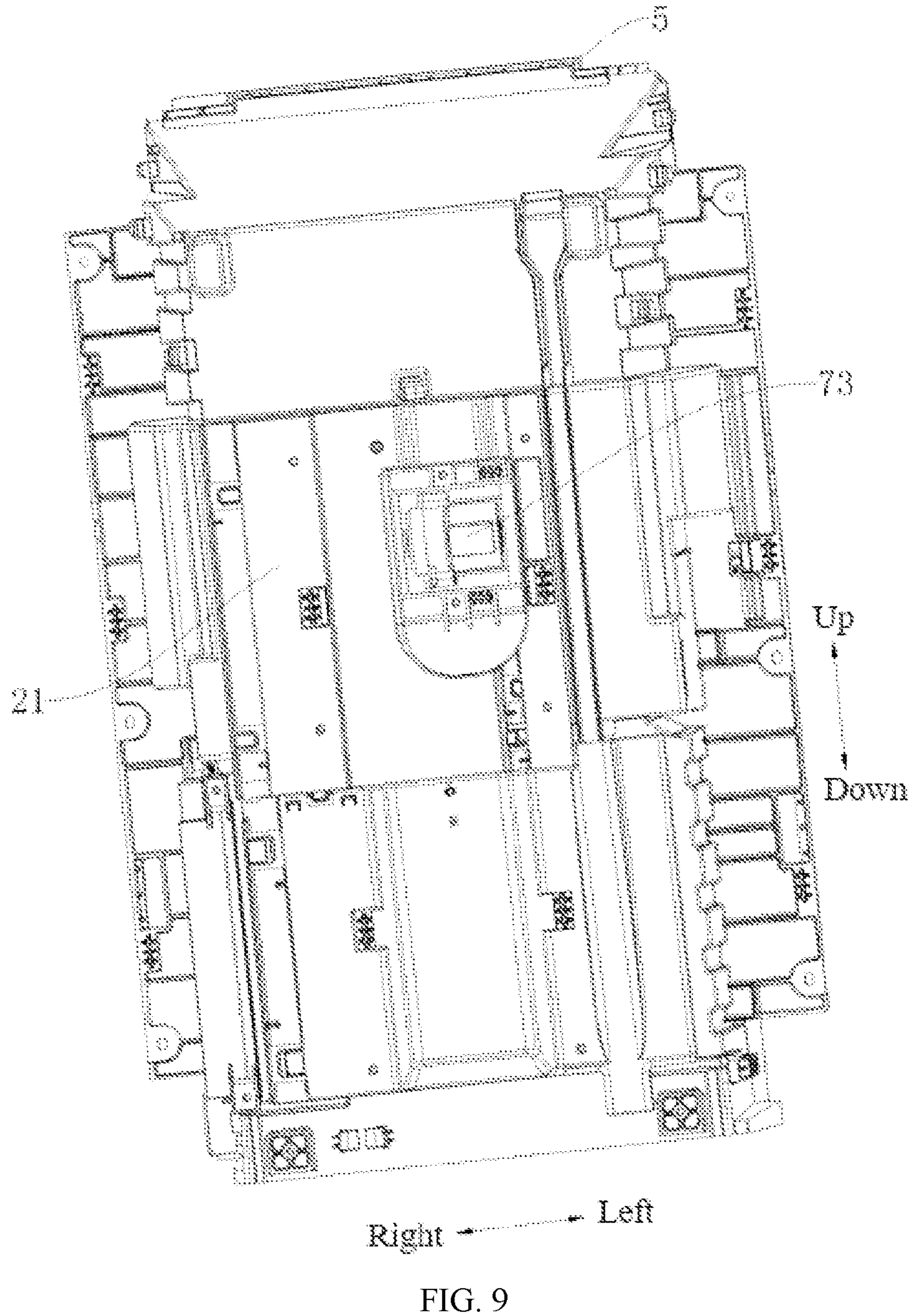
FIG. 9 is yet another partial structural perspective view of the air treatment device of FIG. 4.
Figure 10:
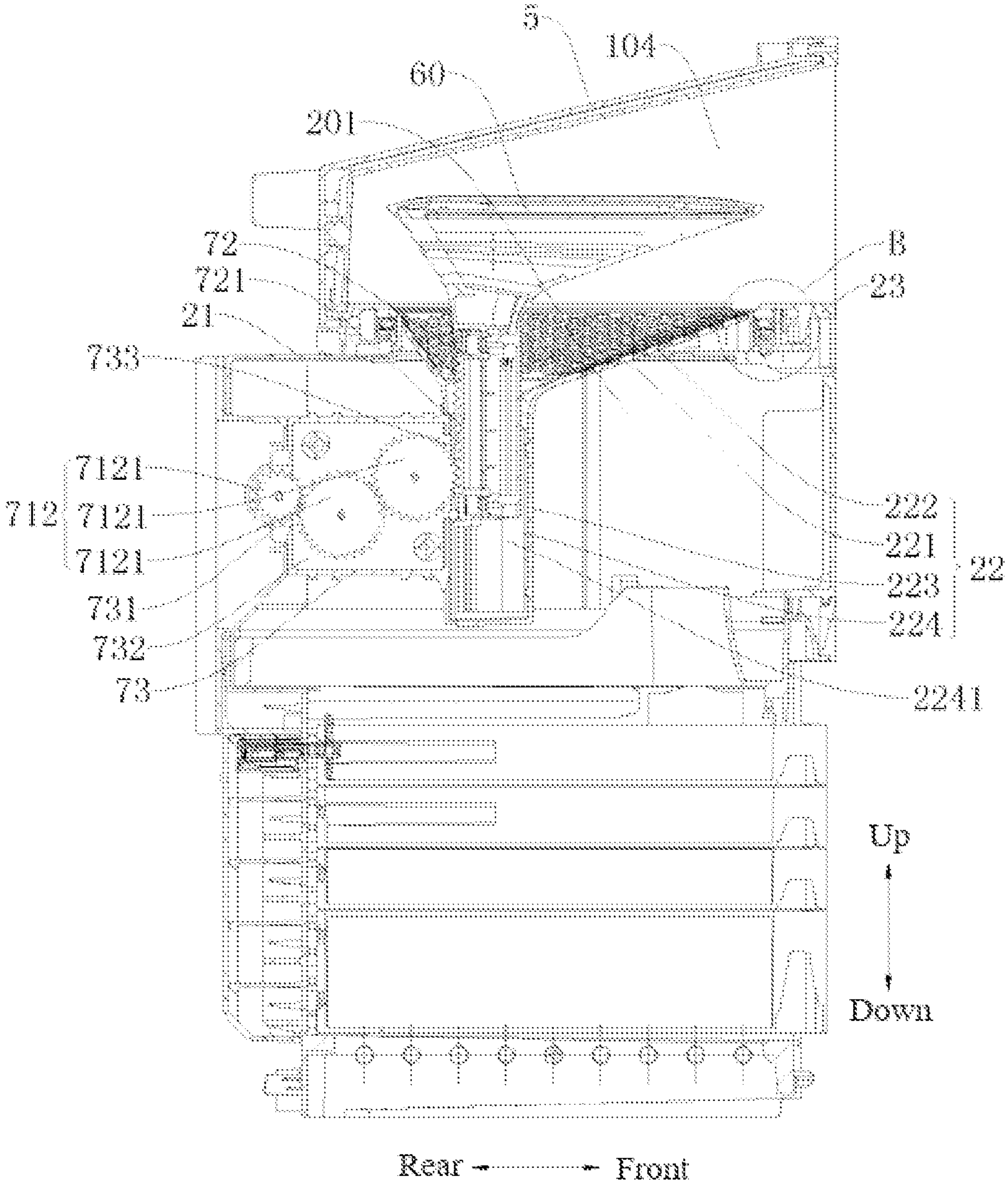
FIG. 10 is a partial structural sectional view of an air treatment device of FIG. 4.
Figure 11:
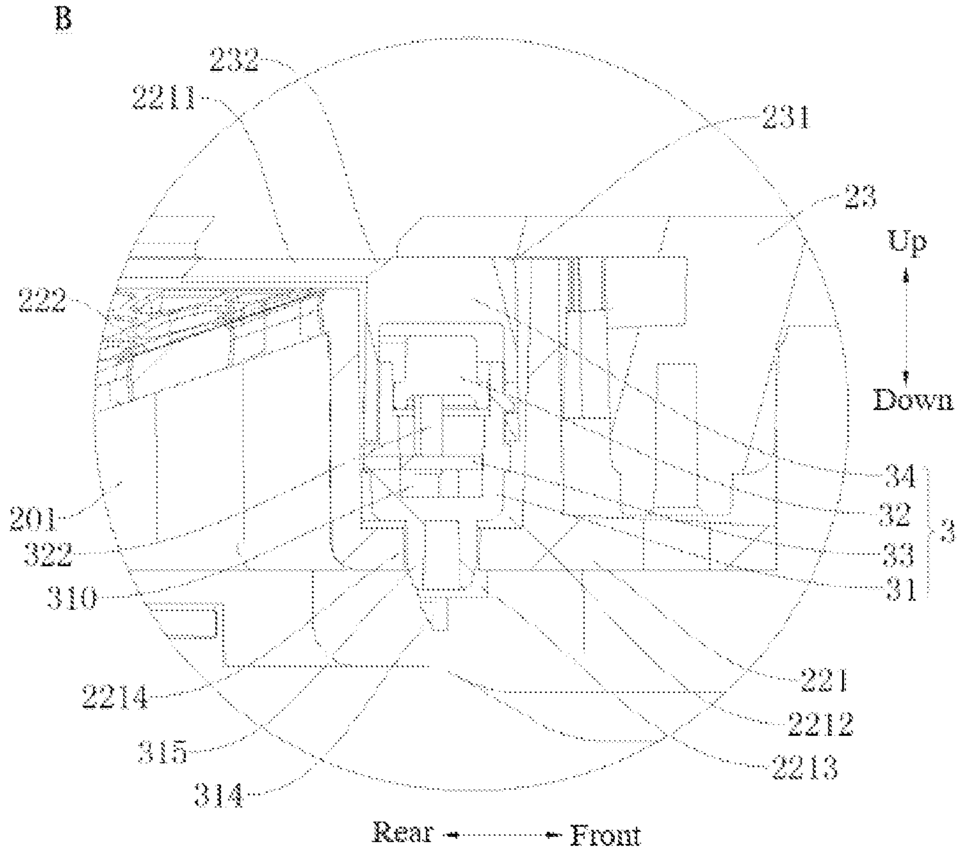
FIG. 11 is an enlarged view at a position B in FIG. 10.
Figure 12:
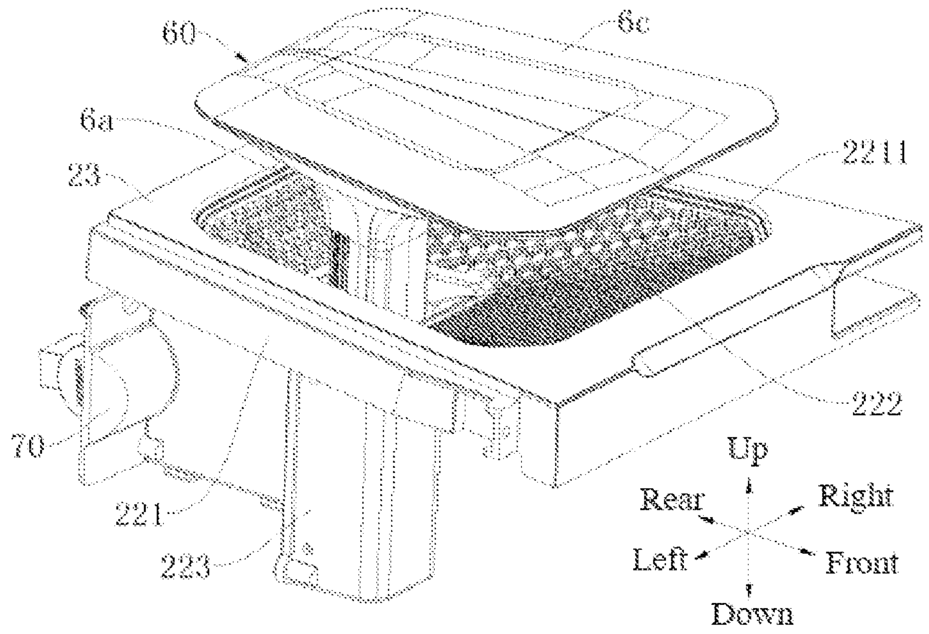
FIG. 12 is a perspective view showing cooperation between a partial structure of an air treatment device of FIG. 4 and an air guide mechanism, in which the first air outlet is opened by the air guide mechanism.
Figure 13:
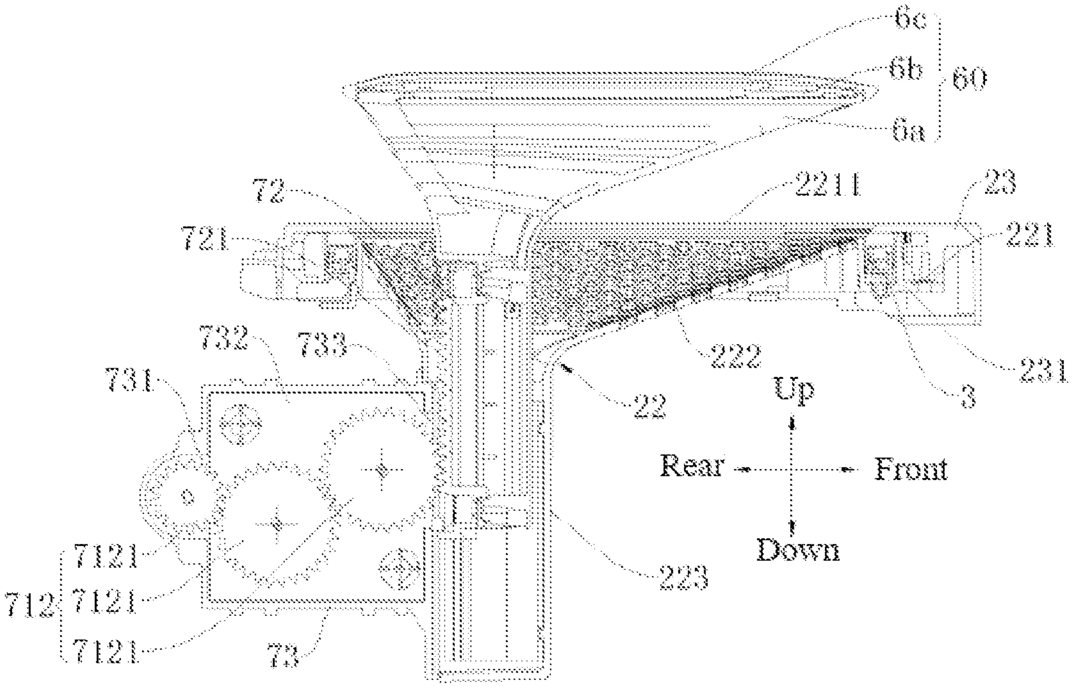
FIG. 13 is a sectional view showing cooperation between the partial structure of the air treatment device and the air guide mechanism of FIG. 12, in which the first air outlet is opened by the air guide mechanism.

According to some embodiments of the present disclosure, referring to FIGS. 9 and 10, the drive mechanism 71 is provided with a drive motor 711 disposed outside an air duct of the air treatment device 20. An influence of airflow in the air duct on the drive motor 711 can be avoided by disposing, outside the air duct, the drive motor 711 configured to drive the air guide mechanism 60. For example, when the air treatment device 20 humidifies the airflow, moisture can be prevented from entering the drive motor 711, which improves reliability of the drive motor 711 and prolongs a service life of the drive motor 711.

According to some exemplary embodiments of the present disclosure, referring to FIGS. 12 to 18, the drive member 72 may include a rack 721, the drive mechanism 71 may include a gear transmission mechanism 712 and the drive motor 711, the gear transmission mechanism 712 includes a plurality of gears 7121 engaged in sequence, one of the plurality of gears 7121 located at a starting end of the gear transmission mechanism 712 is connected to the drive motor 711, one of the plurality of gears 7121 located at a tail end of gear transmission mechanism 712 is engaged with the rack 721. When the drive motor 711 drives the gear transmission mechanism 712 to move, the gear 7121 at the tail end of the gear transmission mechanism 712 is engaged with the rack 721 to drive the drive member 72 to move up and down, and thus to drive the air guide mechanism 60 to move up and down. By using the method that the gear 7121 is engaged with the rack 721 to drive the air guide mechanism 60 to rise and fall, the structure is simple, the transmission is stable, and the reliability is high.

In addition, the gear transmission mechanism 712 includes the plurality of gears 7121 engaged in sequence, for example, the gear transmission mechanism 712 includes three gears 7121 engaged in sequence. Thus, when the drive motor 711 is disposed outside the air duct of the air treatment device 20, since the gear transmission mechanism 712 includes the plurality of gears 7121 engaged in sequence, the gear transmission mechanism 712 can be easily engaged with the rack 721 in the transmission manner, and a structural design of the gear transmission mechanism 712 can be more flexible. A smaller specification size may be set for a single gear 7121 to reduce a weight of the gear transmission mechanism 712.

According to some exemplary embodiments of the present disclosure, referring to FIGS. 11 to 17, the drive assembly 70 may further include a drive box 73, and the drive mechanism 71 is disposed in drive box 73. In an exemplary embodiment of the present disclosure, each of the gear transmission mechanism 712 and the drive motor 711 is disposed in drive box 73, the drive box 73 has an avoidance opening 733, a part of the gear 7121 located at the tail end of the gear transmission mechanism 712 extends out of the drive box 73 through the avoidance opening 733 and is engaged with the rack 721. In this way, the gear 7121 located at the tail end of the gear transmission mechanism 712 is easily engaged with the drive member 72 located outside the drive box 73. The drive box 73 can provide mounting positions for the gear transmission mechanism 712 and the drive motor 711, and can also protect the gear transmission mechanism 712 and the drive motor 711, to avoid dust or other contaminants from entering the engagement between the gear 7121 and the rack 721, and thus to ensure overall performance of the drive mechanism 71. In addition, the drive assembly 70 is modularized, which facilitates mounting, replacement, and maintenance of the drive assembly 70.

In some exemplary embodiments of the present application, referring to FIGS. 9, 10, and 12 to 18, a first chamber 731 and a second chamber 732 are formed in the drive box 73, each of the drive motor 711 and the gear 7121 located at the starting end of the gear transmission mechanism 712 is disposed in the first chamber 731, and the remaining of the plurality of gears 7121 of the gear transmission mechanism 712 is all located in the second chamber 732. The avoidance opening 733 is formed at a side wall of the second chamber 732, and the first chamber 731 is located outside the air duct. By forming the first chamber 731 and the second chamber 732 in the drive box 73, disposing each of the drive motor 711 and the gear 7121 located at the starting end of the gear transmission mechanism 712 in the first chamber 731, and locating the remaining of the plurality of gears 7121 of the gear transmission mechanism 712 all in the second chamber 732, a primary transmission part of the drive mechanism 71 is located in the air duct. At the same time, since the gears 7121 in the air duct are all mounted in the drive box 73, an influence of moisture in the air duct on the gears 7121 can be reduced. Furthermore, the first chamber 731 configured to accommodate the drive motor 711 is located outside the air duct. Therefore, the drive motor 711 can be located outside the air duct to avoid the drive motor 711 from being affected by the airflow inside the air duct. At the same time, the drive motor 711 can be prevented from being influenced by entry of dust outside the air duct, and thus the drive motor 711 can be better protected.

An air conditioner according to an embodiment of the present disclosure is described below with reference to FIGS. 1 to 25.

In this embodiment, the air conditioner is a split floor-standing air conditioner, and includes an air conditioner indoor unit 100 and an air conditioner outdoor unit. The air conditioner indoor unit 100 includes a casing 10, an air treatment device 20, an air heat exchange device 80, an air guide mechanism 60, and a drive assembly 70 configured to drive the air guide mechanism 60 to move.

The casing 10 has a first mounting chamber and a second mounting chamber spaced apart from each other from top to bottom, and the first mounting chamber is located above the second mounting chamber. An air outflowing cavity 104 is further formed in the casing 10 and located between the first mounting chamber and the second mounting chamber. The air outflowing cavity 104 may be located approximately in a middle part of the casing 10 in a height direction of the casing 10. The air outflowing cavity 104 is isolated from the first mounting chamber and in communication with the second mounting chamber. The air heat exchange device 80 is accommodated in the first mounting chamber, and the air treatment device 20 is accommodated in the second mounting chamber. The casing 10 includes a front panel 11, an air outflowing frame component 12, a rear housing component 13, a top cover 14, and a chassis 15. The air outflowing frame component 12 is connected to the rear housing component 13 front to rear. The front panel 11 is connected to a front side of the air outflowing frame component 12. A part of the rear housing component 13 corresponding to the first mounting chamber has a heat exchange air inflowing opening 101. The heat exchange air inflowing opening 101 is in communication with an interior room.

An air duct is formed in the air treatment device 20. The air treatment device 20 has three air inlets 411, and each of the three air inlets 411 is in communication with the air duct in the air treatment device 20. One of the three air inlets 411 is in communication with outdoor air, and the other two of the three air inlets 411 are in communication with indoor air. The air inlet 411 in communication with the outdoor air extends out of the casing 10 through the rear housing component 13 and is in communication with the outdoor air. The rear housing component 13 has two indoor air inflowing openings 103 corresponding to the other two of the three air inlets 411 (the other two of the three air inlets 411 are in communication with the indoor air), respectively.

The front panel 11 includes an upper panel 111 and a lower panel 112 spaced apart from each other from top to bottom, and a first air outflowing opening 105 is formed between the upper panel 111 and the lower panel 112. The first air outflowing opening 105 is equivalent to being formed at the front side wall of the air outflowing cavity 104, and it can be regarded that the front side wall of the air outflowing cavity 104 is opened to form the first air outflowing opening 105. The first air outflowing opening 105 is located approximately in the middle part of the casing 10 in the height direction of the casing 10. The first air outflowing opening 105 faces towards and is in communication with the air outflowing cavity 104. A second air outflowing openings 106 is formed at each of a left side and a right side of the air outflowing frame component 12. An air guide plate 16 configured to open or close the second air outflowing opening 106 is disposed at the second air outflowing opening 106. The top cover 14 is connected to a top of the rear housing component 13 and the air outflowing frame component 12, and the chassis 15 is connected to a bottom of the rear housing component 13 and the air outflowing frame component 12.

The air heat exchange device 80 includes a heat exchanger component 82 and a second fan component 81. The heat exchanger component 82 is disposed at a rear side of the second fan component 81, and the second fan component 81 may include two cross-flow rotors spaced apart from each other at a left and right of the second fan component 81, and the two cross-flow rotors correspond to the two heat exchange air outflowing openings 102, respectively. When the air heat exchange device 80 operates, the second fan component 81 drives indoor air to be introduced into the first mounting chamber from the heat exchange air inflowing opening 101. After exchanging heat with the heat exchanger component 82, the air is blown out indoors from the heat exchange air outflowing openings 102. Therefore, an indoor ambient temperature can be adjusted to realize cooling/heating. A swing door 17 extending in an up-down direction is disposed at each of the heat exchange air outflowing openings 102. Each of the swing doors 17 may extend downwards to be adjacent to a bottom of the casing 10 and may be movably disposed at the air outflowing frame component 12 in a circumferential direction of the casing 10. A corresponding heat exchange air outflowing opening 102 may be opened or closed by moving the swing door 17.

The air treatment device 20 includes an air treatment unit 4, an air outflowing housing 2, an air induction hood 5, and a light emission component 3. The air induction hood 5 is disposed at the top of the air outflowing housing 2. The air treatment unit 4 includes a first fan component 41, a humidification component 42, and a purification component 43. The first fan component 41 has the three air inlets 411 described above. The purification component 43 is disposed at an air outflowing side of the first fan component 41 and is located above the first fan component 41. The humidification component 42 is disposed in the air outflowing housing 2. The first fan component 41, the purification component 43, and the air outflowing housing 2 are sequentially arranged from bottom to top. An air outflowing chamber 201 is formed between the humidification component 42 and an inner wall of the air outflowing housing 2. Both the first air outlet 2211 and the second air outlet 211 are in communication with the air outflowing chamber 201. The humidification component 42 has humidification membranes located in the air outflowing chamber 201, and the humidification membranes are adjacent to the two second air outlets 211 and faces towards the two second air outlets 211, respectively. The purification component 43 has a purification chamber in communication with the air outflowing chamber 201. By sequentially arranging the first fan component 41, the purification component 43, and the air outflowing housing 2 in the direction from bottom to top, the structure arrangement of the air treatment device 20 is reasonable and compact, and airflow flowing into the first fan component 41 from the air inlet 411 sequentially flows upwards through the purification component 43 for purification and then flows into the air outflowing chamber 201 of the air outflowing housing 2. Therefore, the air has a shorter flowing path and flows smoother.

The first fan component 41 includes a volute and a centrifugal rotor. The volute is in communication with the air inlet 411. The centrifugal rotor is disposed in the volute. The volute is in communication with the purification chamber of the purification component 43. The purification chamber is in communication with the air outflowing chamber 201 of the air outflowing housing 2. The air induction hood 5 is disposed at a top of the air outflowing housing 2 and located in the casing 10. The air outflowing cavity 104 is formed by the top of the air outflowing housing 2, the air induction hood 5, and the casing 10.

The purification component 43 includes a plurality of layers of purification members 431 stacked to each other in a flowing direction of the airflow. For example, the plurality of layers of stacked purification members 431 may be arranged in the up-down direction, and each of the plurality of layers of purification members 431 is pullably disposed in the purification chamber. Therefore, by providing the purification component 43 with the plurality of layers of purification members 431 stacked to each other in the flowing direction of the airflow, a purification effect can be improved, and each of the plurality of layers of purification members 431 can be thus pullably disposed in the purification chamber, facilitating replacement of each of the plurality of layers of purification members 431. For example, each of the plurality of layers of purification members 431 can be pullably provided forwards and backwards in the purification chamber, and therefore the lower panel 112 can open a front space of the air treatment device 20. The purification member 431 can be easily replaced by pulling the purification member 431.

The air outflowing housing 2 includes a housing body 21, a fixation support 23, and an air outflowing member 22. A top of the housing body 21 may have a mounting opening. The air outflowing member 22 may be disposed at the mounting opening and may have the first air outlet 2211 in communication with the air outflowing chamber 201. The fixation support 23 is disposed at the air outflowing member 22 and located at the outer peripheral side of the first air outlet 2211. The fixation support 23 is in an annular shape, and the annular-shaped fixation support 23 may surround the air outflowing member 22. The fixation support 23 is connected to the housing body 21, and the air outflowing member 22 is easily connected to the housing body 21 by the fixation support 23. The air outflowing member 22 of the air outflowing housing 2 and the humidification component 42 are arranged in a front-rear direction of the housing body 21. For example, the humidification component 42 is located in a front of the housing body 21, and the air outflowing member 22 is located in a rear of the housing body 21.

The air outflowing member 22 may include an air outflowing part 221 and mounting part 223. The air outflowing part 221 may be disposed at the mounting opening, the air outflowing part 221 may have the first air outlet 2211 and may include an air outflowing grille 222 located at the first air outlet 2211. The mounting part 223 may be connected below the air outflowing part 221, for example, the mounting part 223 may be connected to a bottom of the air outflowing grille 222. The mounting part 223 may have an accommodation space 2231 having an opened rear side. The accommodation space 2231 may be provided with a guide part 224. The guide part 224 and the air outflowing member 22 may be detachably connected to each other, for example, the guide part 224 may be fixed at the mounting part 223 by a fastener. The guide part 224 has a guide chamber 2241 having an opened rear side. A guide groove 2242 extending in the up-down direction is formed at each of a left side wall and a right side wall of the guide chamber 2241 and adjacent to an opened part of a rear side of the guide chamber 2241. When the air outflowing member 22 is mounted at the housing body 21, the fixation support 23 is sleeved on the outer periphery of the air outflowing part 221 and connected to an upper end of the housing body 21, the air outflowing member 22 is located in the housing body 21, and the air outflowing chamber 201 is formed by the air outflowing member 22, the housing body 21, and the humidification component 42. Two second air outlets 211 may be formed at a left side wall and a right side wall of the housing body 21, respectively. Each of the two second air outlets 211 is in communication with the air outflowing chamber 201. The two second air outlets 211 face towards and are in communication with the second air outflowing openings 106, respectively.

The inner chamber of the volute, the purification chamber of the purification component 43, and the air outflowing chamber 201 of the air outflowing housing 2 are all formed as a part of the air duct of the air treatment device 20.

An air guide mechanism 60 is movably provided in the casing 10 in an up-down direction to open or close the first air outlet 2211. In an exemplary embodiment of the present disclosure, when the air guide mechanism 60 moves upwards to a first predetermined position, the first air outlet 2211 is opened by the air guide mechanism 60. In this case, a part of the air guide mechanism 60 can be accommodated in the air outflowing cavity 104; and when the air guide mechanism 60 moves downwards to a second predetermined position, the first air outlet 2211 is closed by the air guide mechanism 60.

The air guide mechanism 60 includes an air guide mechanism body **6*a*, a liner plate 6*b*, and a decoration cover 6*c*. The liner plate 6*b* is disposed between the air guide mechanism body 6*a* and the decoration cover 6*c*. In an exemplary embodiment of the present disclosure, the liner plate 6*b* is disposed at a top of the air guide mechanism body 6*a*, and the decoration cover 6*c* is disposed at an upper surface of the liner plate 6*b*. The liner plate 6*b* is detachably connected to the air guide mechanism body 6*a*, and the decoration cover 6*c* is connected to the liner plate 6*b* by an adhesive layer. Each of a middle part of the liner plate 6*b* and a part adjacent to an outer periphery of the liner plate 6*b* protrudes upwards to form a protrusion 61*b*, and the adhesive layer is disposed on the protrusion 61*b*, facilitating the connection of the liner plate 6*b* to the decoration cover 6*c***.

The air guide mechanism body **6*a* includes a first air guide member 61 and a second air guide member 62 detachably connected to each other in a front-rear direction. The first air guide member 61 is connected to a front side of the second air guide member 62. The first air guide member 61 includes a first air guide part 611 and a first movable part 612 connected below the first air guide part 611, and the first air guide member 61 is an integrally molded member. The second air guide member 62 includes a second air guide part 621 and a second movable part 622 connected below the second air guide part 621, and the second air guide member 62 is integrally molded. A butt-joint line between the first air guide part 611 and the second air guide part 621 surrounds the first air guide part 611. The butt-joint line between the first air guide part 611 and the second air guide part 621 has a length greater than half of a circumference of the first air guide part 611. The butt-joint line between the first air guide part 611 and the second air guide part 621 extends obliquely downwards in a front-rear direction. A butt-joint line between the first movable part 612 and the second movable part 622** extends in the up-down direction.

The liner plate **6*b* has a limit hole 63*b* and a first fixation hole 62*b*. Two limit holes 63*b* are provided and adjacent to a rear side of the liner plate 6*b*, and four first fixation holes 62*b* are provided and adjacent to four corners of the liner plate 6*b*, respectively. The limit holes 62*b* and the first fixation holes 62*b* each are formed at a part of the liner plate 6*b* where no protrusion 61*b* is formed. The air guide mechanism body 6*a* has a second fixation hole 6112 corresponding to the first fixation hole 62*b* and a limit protrusion 6111 engaged with the limit hole 63*b* and formed at the first air guide part 611. Four limit protrusions 6111 are provided, two of the four limit protrusions 6111 are adjacent to a rear side of the first air guide part 611, and spaced apart from each other in a left-right direction, and the other two of the four limit protrusions 6111 are adjacent to a front side of the first air guide part 611 and spaced apart from each other in the left-right direction. Four second fixation holes 6112 are provided, two of the four fixation holes 6112 are formed at the first air guide part 611 and adjacent to a front corner of the first air guide part 611, and the other two of the four second fixation holes 6112 are formed at the second air guide part 621 and adjacent to a rear corner of the second air guide part 621**.

When the liner plate **6*b* is connected to the air guide mechanism body 6*a*, the first fixation hole 62*b* at the liner plate 6*b* and the second fixation hole 6112 at the air guide mechanism body 6*a* may correspond to each other, and the limit protrusion 6111 at the air guide mechanism body 6*a* may be inserted into the limit hole 63*b* at the liner plate 6*b*. In this way, a fitting between the liner plate 6*b* and the air guide mechanism body 6*a* may be preliminarily positioned. Then, a first fastener such as a screw passes through the first fixation hole 62*b* and the second fixation hole 6112. Thus, the liner plate 6*b* can be reliably connected to the air guide mechanism body 6*a***.

The first air guide part 611 has a first airflow channel 610, and a front end and a rear end of the first airflow channel 610 each are open; and the second air guide part 621 has a second airflow channel 620, and a front end and a rear end of the second airflow channel 620 each are open. The first air guide part 611 has four third engagement holes 6113 adjacent to four corners of the first air guide part 611, respectively, and the second air guide part 621 has four third engagement members 6211 adjacent to four corners of the second air guide part 621, respectively.

When the first air outlet 2211 is opened by the air guide mechanism 60, the decoration cover **6*c*, the first air guide part 611, the second air guide part 621, and a part of the first movable part 612, and a part of the second movable part 622 are located in the air outflowing cavity 104. The first air guide member 61 is butt-jointed to the second air guide member 62 in the front-rear direction, and a rear side of the first airflow channel 610 is butt-jointed to and in communication with a front side of the second airflow channel 620. Thus, when the first air guide member 61 and the second air guide member 62 are connected to each other to be fitted into the air guide mechanism body 6*a*, the first airflow channel 610 in the first air guide member 61 is in communication with the second airflow channel 620 in the second air guide member 62 to form a total airflow channel that penetrates the air guide mechanism body 6*a* in the front-rear direction. In this way, a part of the airflow flowing into the air outflowing cavity 104 from the first air outlet 2211 of the air treatment device 20 can flow to the first air outflowing opening 105 through a space between the air guide mechanism 60 and the inner wall of the air outflowing cavity 104, and another part can flow to the first air outflowing opening 105 through the airflow channel at the air guide mechanism 60 (sequentially flowing through the second airflow channel 620 and the first airflow channel 610). This can reduce resistance of the airflow flowing into the air outflowing cavity 104 towards the first air outflowing opening 105, to enable smoother air outflowing, and to enable overall air outflowing of the first air outflowing opening 105** be more uniform.

The drive assembly 70 includes a drive mechanism 71 and a drive member 72. The drive member 72 includes a rack 721 and is disposed at a side of the second movable part 622 facing away from the first movable part 612, and each of a left side and a right side of the drive member 72 is provided with guide rib 723 extending in the up-down direction. The first movable part 612 has two third fixation holes 6121 spaced apart from each other up and down. The second movable part 622 has two fourth fixation holes 6221 spaced apart from each other up and down. The drive member 72 has two fifth fixation holes 722 spaced apart from each other up and down. A second fastener passes through the fifth fixation hole 722, the fourth fixation hole 6221, and the third fixation hole 6121. When the first air guide member 61, the second air guide member 62, and the drive member 72 are fitted, the first air guide part 611 of the first air guide member 61 is connected to the second air guide part 621 of the second air guide member 62 by engaging the third engagement member 6211 with the third engagement hole 6113. Thus, the first airflow channel 610 in the first air guide part 611 is butt-jointed to the second airflow channel 620 in the second air guide part 621 to form an airflow channel extending in the front-rear direction, and each of a front side and a rear side of this airflow channel are open. The drive member 72 can be mounted to the second movable part 622 and the first movable part 612 can be connected to the second movable part 622 by the second fastener passing through the fifth fixation hole 722 at the drive member 72, the fourth fixation hole 6221 at the second movable part 622, and the third fixation hole 6121 at the first movable part 612, reducing a fitting process and improving fitting efficiency.

The drive mechanism 71 includes a gear transmission mechanism 712 and a drive motor 711. The gear transmission mechanism 712 includes three gears 7121 engaged in sequence. One of the three gears 7121 located at a starting end of the gear transmission mechanism 712 is connected to the drive motor 711, and one of the three gears 7121 located at a tail end of the gear transmission mechanism 712 is engaged with the rack 721. The drive assembly 70 further includes a drive box 73. The drive mechanism 71 is disposed in the drive box 73, each of the gear transmission mechanism 712 and the drive motor 711 is disposed in the drive box 73, the drive box 73 has an avoidance opening 733, and a part of the gear 7121 located at the tail end of the gear transmission mechanism 712 extends out of the drive box 73 through the avoidance opening 733 and is engaged with the rack 721. A first chamber 731 and a second chamber 732 are formed in the drive box 73, each of the drive motor 711 and the gear 7121 located at the starting end of the gear transmission mechanism 712 is disposed in the first chamber 731, and each of the remaining two gears 7121 in the gear transmission mechanism 712 is disposed in the second chamber 732. The avoidance opening 733 is formed at a side wall of the second chamber 732, and the first chamber 731 is located outside the air duct.

The part of the drive box 73 forming the first chamber 731 may be located at an outer side the air outflowing housing 2, and therefore the drive motor 711 may be located outside the air outflowing chamber 201, that is, the drive motor 711 may be located outside the air duct of the air treatment device 20, to avoid the influence of the airflow in the air treatment device 20 on the drive motor 711, for example, to avoid the influence of the humidified airflow in the air treatment device 20 on the drive motor 711. The part of the drive box 73 forming the second chamber 732 is located in the air outflowing chamber 201, which can allow for a compact structure. Moreover, although the other two gears 7121 of the drive mechanism 71 are located in the air outflowing chamber 201, since the other two gears 7121 of the drive mechanism 71 are mounted in the second chamber 732 of the drive box 73, the influence of the airflow in the air outflowing chamber 201 on the engagement of the gears 7121 can be better avoided.

Further, the drive box 73 includes a first box 734 and a second box 735 detachably connected to each other, to facilitate a mounting, dismounting and maintenance of the drive mechanism 71.

When the air guide mechanism 60 is fitted with the air outflowing member 22, the first movable part 612 and the second movable part 622 of the air guide mechanism body **6*a* are inserted into the guide chamber 2241 of the guide part 224 and can move up and down, and the guide rib 723 at the drive member 72 is engaged with the guide groove 2242 at the side wall of the guide chamber 2241. During an upward and downward movement of the air guide mechanism 60, the first movable part 612 and the second movable part 622 of the air guide mechanism body 6*a* move in a guidance direction of the guide chamber 2241. Meanwhile, the guide rib 723 moves up and down along the guide groove 2242 to realize a guidance effect on the upward and downward movement of the air guide mechanism 60. Therefore, the air guide mechanism 60** can stably move in the up-down direction.

An upper surface of the air outflowing part 221 of the air outflowing member 22 has an accommodation groove 2212 located at the outer peripheral side of the first air outlet 2211. The accommodation groove 2212 extends in an annular shape in the circumferential direction of the first air outlet 2211. The light emission component 3 is disposed in the accommodation groove 2212, and the light emission component 3 is in an annular shape and is consistent with the extending direction of the accommodation groove 2212. The accommodation groove 2212 has a side opened towards the air outflowing cavity 104 to form an opening. The fixation support 23 covers a part of the opening in a radial direction of the first air outlet 2211, and the fixation support 23 covers most of the opening in the radial direction of the first air outlet 2211 and the covered part of the opening faces away from the first air outlet 2211. An accommodation chamber 231 is formed between an inner wall of the accommodation groove 2212 and the fixation support 23. An uncovered part of the opening is formed as the light-permeable member 232 being a light-permeable hole, and the light-permeable member 232 is in an annular shape and formed as a periphery of the first air outlet 2211. The light-permeable member 232 has a radial width smaller than a radial width of light emission component 3, and the light-permeable member 232 has the radial width smaller than a radial width of the opening of accommodation groove 2212.

The projection of the light-permeable member 232 on the reference surface is located in the projection of the air guide mechanism 60 on the reference surface. When the air guide mechanism 60 moves upwards to open the first air outlet 2211, the light-permeable member 232 is spaced apart from the air guide mechanism 60 by a certain distance in the up-down direction. In this case, the light emitted by the light emission component 3 is emitted upwards into the air outflowing cavity 104 through the light-permeable member 232, and an amount of the light emitted into the air outflowing cavity 104 is relatively large. When the first air outlet 2211 is closed by the air guide mechanism 60, a light transmission channel is formed between the air guide mechanism 60 and the air outflowing housing 2, the light transmission channel has a radial inner end facing towards the light-permeable member 232 and a radial outer end formed as a light outlet 233. The light emitted by the light emission component 3 is emitted into the light transmission channel through the light-permeable member 232 and travels radially to the light outlet 233, and then is emitted from the light outlet 233 substantially radially into the air outflowing cavity 104. Compared with when the first air outlet 2211 is opened by the air guide mechanism 60, a light emission direction of the light emission component 3 and a light emission amount towards the air outflowing cavity 104 are changed.

The light emission component 3 is in an annular shape, for example, the light emission component 3 may be in a quadrilateral annular shape. The light emission component 3 includes a lamp socket 31, a light emission member 33, a lamp cover 32, and a light guide hood 34. Each of the lamp socket 31, the lamp cover 32, and the light guide hood 34 is in a closed annular shape. The light emission member 33 is a light emission band and in an open annular shape. Each of two open ends of the light emission member 33 is provided with a wire harness electrically connected to the light emission member 33. The wire harness is connected to a circuit board in an electric control box assembly of a complete machine to realize a power supply to the light emission member 33.

The lamp socket 31 has a mounting recess 310, the light emission member 33 is disposed in the mounting recess 310, and the lamp socket 31 is opaque. The lamp socket 31 is further provided with a wire outlet part 317 protruding and extending outwards in a radical direction of the lamp socket 31, and the wire harness connected to the light emission member 33 penetrates the wire outlet part 317 for a wire outlet. The lamp cover 32 is transparent and covers an open end of the lamp socket 31, and at least part of the lamp cover 32 is accommodated in the mounting recess 310. An inner peripheral wall of the mounting recess 310 may have a first limit surface 311, and the light emission member 33 is mounted at a side of the first limit surface 311 facing away from the lamp cover 32. An outer peripheral wall of the lamp cover 32 has a seal recess 321 configured to accommodate a sealant, and the seal recess 321 extends in an annular shape in a circumferential direction of the lamp cover 32. A side of the lamp cover 32 adjacent to the light emission member 33 is provided with a plurality of press protrusions 322 arranged at intervals in the circumferential direction of the lamp cover 32. When the lamp cover 32 is mounted at the lamp socket 31, the sealant is filled in the seal recess 321 of the lamp cover 32, and the lamp cover 32 is mounted at the mounting recess 310 of the lamp socket 31. When the lamp cover 32 abuts with the first limit surface 311 in the mounting recess 310, it indicates that the lamp cover 32 is mounted in place. The lamp cover 32 is sealingly connected to the lamp socket 31 by the sealant, and the plurality of press protrusions 322 at the lamp cover 32 is pressed against the light emission member 33 to allow the light emission member 33 to be stably fixed in the mounting recess 310.

An inner peripheral wall of the lamp socket 31 is provided with a plurality of second engagement members 316 arranged at intervals in a circumferential direction of the lamp socket 31, and an outer peripheral wall of the lamp socket 31 is provided with a plurality of second engagement members 316 arranged at intervals in the circumferential direction of the lamp socket 31. An inner peripheral wall of the light guide hood 34 has a plurality of second engagement holes 341 that may be arranged at intervals in a circumferential direction of the light guide hood 34, and an outer peripheral wall of the light guide hood 34 has a plurality of second engagement holes 341 that may be arranged at intervals in the circumferential direction of the light guide hood 34.

Further, the inner peripheral wall of the lamp socket 31 has a second limit surface 312 extending in an annular shape in the circumferential direction of the lamp socket 31; and the outer peripheral wall of the lamp socket 31 has a third limit surface 313 extending in an annular shape in the circumferential direction of the lamp socket 31. When the light guide hood 34 is fitted and connected to the lamp socket 31, the inner peripheral wall of the light guide hood 34 abuts with the second limit surface 312, and the outer peripheral wall of the light guide hood 34 abuts with the third limit surface 313. It is indicated that the light guide hood 34 is mounted in place, the second engagement member 316 at the inner peripheral wall of the lamp socket 31 is engaged with the second engagement hole 341 at the inner peripheral wall of the light guide hood 34, and the second engagement member 316 at the outer peripheral wall of the lamp socket 31 is engaged with the second engagement hole 341 at the outer peripheral wall of the light guide hood 34. Therefore, the connection of the light guide hood 34 to the lamp socket 31 can be facilitated.

A side of the lamp socket 31 facing away from the light guide hood 34 is provided with a plurality of first engagement members 314 arranged at intervals in the circumferential direction of the lamp socket 31. The side of the lamp socket 31 facing away from the light guide hood 34 (e.g., a bottom surface of the lamp socket 31) is further provided with two positioning protrusions 315 spaced apart from each other in the circumferential direction of the lamp socket 31. The positioning protrusions 315 and the first engagement members 314 are located at a same side of the lamp socket 31, and at least one first engagement member 314 is disposed between the two positioning protrusions 315. A bottom wall of the accommodation groove 2212 has a first engagement hole 2213 configured to be engaged with the first engagement member 314 and a positioning hole 2214 configured to be engaged with the positioning protrusion 315. When the light emission component 3 is mounted in the accommodation groove 2212, the positioning protrusion 315 at the light emission component 3 can be inserted into the positioning hole 2214 to allow the light emission component 3 to be preliminarily positioned in the accommodation groove 2212. In this case, it is indicated that the mounting position of the light emission component 3 is accurate, and the first engagement member 314 is engaged with the first engagement hole 2213. Thus, the light emission component 3 can be accurately and reliably mounted and fixed in the accommodation groove 2212.

When the air treatment device 20 operates, the light emission component 3 can be controlled to be turned on. In this case, the light emitted by the light emission component 3 can be emitted into the air outflowing cavity 104 and is generally in a shape of a light circle. When the air treatment device 20 is out of operation, the light emission component 3 can be controlled to stop operating. Therefore, the user can intuitively and conveniently know whether the air treatment device 20 is in the operational state based on whether there is the light of the light emission component 3 in the air outflowing cavity 104. In addition, when the air treatment device 20 operates, compared with when the first air outlet 2211 is closed by the air guide mechanism 60, more light is emitted from the light emission component 3 towards the air outflowing cavity 104 when the first air outlet 2211 is opened by the air guide mechanism 60. In this way, the user can more intuitively obtain a condition of the air outflow of the first air outflowing opening 105.

When the air conditioner operates, one of the air treatment device 20 and the air heat exchange device 80 can be controlled to operate, or both of the air treatment device 20 and the air heat exchange device 80 can be controlled to operate.

When only the air heat exchange device 80 operates, the second fan component 81 operates, the indoor air is introduced into the first mounting cavity from the heat exchange air inflowing opening 101 and exchanges heat with the heat exchanger component 82, and then flows out indoors from the heat exchange air outflowing openings 102 at two sides. Therefore, the indoor temperature can be adjusted.

The operation of the air treatment device 20 may include the following cases: only an air inlet 411 in communication with the outdoor air among the three air inlets 411 is opened; only the air inlet 411 in communication with the indoor air among the three air inlets 411 is opened; and the three air inlets 411 are all opened.

In the first case, only the air inlet 411 in communication with the outdoor air among the three air inlets 411 is opened, and the operation of the air treatment device 20 may include the following cases.

When only the air treatment device 20 operates, the first fan component 41 operates; and when only air outflowing from the first air outflowing opening 105 is required, the second air outflowing opening 106 is closed by the air guide plate 16, and the first air outlet 2211 is opened by the air guide mechanism 60. In this case, the first air outlet 2211 is in communication with the first air outflowing opening 105 through the air induction chamber. Air introduced from outdoors flows upwards into the air outflowing chamber 201 of the air outflowing housing 2 after being purified by the purification component 43, flows into the air induction chamber from the first air outlet 2211 without being humidified by the humidification component 42, and finally flows out indoors from the first air outflowing opening 105. Thus, the outdoor air can be introduced indoors. In this case, the outdoor air introduced from the air inlet 411 can be purified and then flows indoors to improve the indoor air quality.

When only air outflowing of the second air outflowing opening 106 is required, the second air outflowing opening 106 is opened by the air guide plate 16, the first air outlet 2211 is closed by the air guide mechanism 60. The air introduced from outdoors flows upwards into the air outflowing chamber 201 of the air outflowing housing 2 after being purified by the purification component 43, and then is blown out indoors through two second air outlets 211 and two second air outflowing openings 106 in sequence after being humidified by the humidification component 42. The air introduced from the outside no longer flows out from the first air outflowing opening 105, but flows out indoors from the second air outlets 211 at the two sides through the second air outflowing opening 106. Therefore, the outdoor air can be introduced indoors. In this case, the outdoor air introduced from the air inlet 411 can be purified and humidified, and then flow indoors to improve the indoor air quality.

When simultaneous air outflowing from the first air outflowing opening 105 and the second air outflowing opening 106 is required, the first air outlet 2211 is opened by the air guide mechanism 60, and the second air outflowing opening 106 is opened by the air guide plate 16. After being driven by the first fan component 41 to be introduced into the first fan component 41 from the air inlet 411, airflow flows upwards and is purified by the purification component 43 first. The purified airflow flows upwards into the air outflowing chamber 201. A part of the airflow introduced into the air outflowing chamber 201, without being humidified by the humidification component 42, is blown upwards into the air induction chamber through the first air outlet 2211 and is blown out indoors through the first air outflowing opening 105, and another part is humidified by the humidification component 42 and then flows out from two second air outlets 211 and two second air outflowing opening 106 in sequence. Fresh air introduced from outdoors is simultaneously blown out from the first air outflowing opening 105 and the second air outflowing opening 106, and therefore an air outflowing range is enlarged to realize multidimensional air outflowing. In this case, the outdoor air introduced from the air inlet 411 can be purified and partially humidified, and then flows into indoors, which can quickly and effectively improve the indoor air quality.

In another exemplary embodiment of the present disclosure, when the air treatment device 20 operates, the first air outlet 2211 may be in a normally open state. For example, the first air outlet 2211 is opened when the first fan component 41 is powered on to operate, and the first air outlet 2211 is correspondingly closed when the first fan component 41 is shut down. Whether to open the second air outflowing opening 106 may be determined based on whether there is a humidification demand, and the second air outflowing opening 106 may be opened when there is a humidification demand, and may be closed when there is no humidification demand.

In the second case, only the air inlet 411 in communication with the indoor air among the three air inlets 411 is opened, and the operation of the air treatment device 20 may include the following cases.

When only the air treatment device 20 operates, the first fan component 41 operates; and when only air outflowing from the first air outflowing opening 105 is required, the second air outflowing opening 106 is closed by the air guide plate 16, and the first air outlet 2211 is opened by the air guide mechanism 60. In this case, the first air outlet 2211 is in communication with the first air outflowing opening 105 through the air induction chamber. Air introduced from indoors flows upwards into the air outflowing chamber 201 of the air outflowing housing 2 after being purified by the purification component 43, then flows into the air induction chamber from the first air outlet 2211 without being humidified by the humidification component 42, and finally flows out indoors from the first air outflowing opening 105. Therefore, the indoor air can be purified to improve the indoor air quality.

When only air outflowing of the second air outflowing opening 106 is required, the second air outflowing opening 106 is opened by the air guide plate 16, and the first air outlet 2211 is closed by the air guide mechanism 60. The air introduced from indoors flows upwards into the air outflowing chamber 201 of the air outflowing housing 2 after being purified by the purification component 43, and then is blown out indoors through two second air outlets 211 and two second air outflowing openings 106 in sequence after being humidified by the humidification component 42. The air introduced from indoors no longer flows out from the first air outflowing opening 105, but flows out indoors from the second air outlets 211 at the two sides through the second air outflowing opening 106. Therefore, the indoor air can be purified and humidified to improve the indoor air quality.

When simultaneous air outflowing from the first air outflowing opening 105 and the second air outflowing opening 106 is required, the first air outlet 2211 is opened by the air guide mechanism 60, and the second air outflowing opening 106 is opened by the air guide plate 16. After being driven by the first fan component 41 to be introduced into the first fan component 41 from the air inlet 411, airflow flows upwards and is purified by the purification component 43 first. The purified airflow flows upwards into the air outflowing chamber 201. A part of the airflow introduced into air outflowing chamber 201, without being humidified by the humidification component 42, is blown upwards into the air induction chamber through the first air outlet 2211 and is blown out indoors through the first air outflowing opening 105, and another part is humidified by the humidification component 42 and then flows out from two second air outlets 211 and two second air outflowing opening 106 in sequence. The air introduced from outdoors is simultaneously blown out from the first air outflowing opening 105 and the second air outflowing opening 106, and therefore the air outflowing range is enlarged to realize the multidimensional air outflowing. In this case, the indoor air introduced from the air inlet 411 can be purified and partially humidified, and then flows indoors, which can quickly and effectively improve the indoor air quality.

In another exemplary embodiment of the present disclosure, when the air treatment device 20 operates, the first air outlet 2211 may be in a normally open state. For example, the first air outlet 2211 is opened when the first fan component 41 is powered on to operate, and the first air outlet 2211 is correspondingly closed when the first fan component 41 is shut down. Whether to open the second air outflowing opening 106 may be determined based on whether there is a humidification demand, and the second air outflowing opening 106 may be opened when there is a humidification demand, and may be closed when there is no humidification demand.

In the third case, three air inlets 411 are all open, and the operation of the air treatment device 20 may include the following cases.

When only the air treatment device 20 operates, the first fan component 41 works; and when only air outflowing from the first air outflowing opening 105 is required, the second air outflowing opening 106 is closed by the air guide plate 16, and the first air outlet 2211 is opened by the air guide mechanism 60. In this case, the first air outlet 2211 is in communication with the first air outflowing opening 105 through the air induction chamber. Air introduced from indoors and outdoors flows upwards into the air outflowing chamber 201 of the air outflowing housing 2 after being purified by purification component 43, flows into the air induction chamber from the first air outlet 2211 without being humidified by the humidification component 42, and finally flows out into indoors from the first air outflowing opening 105. Therefore, the indoor air can be purified to improve the indoor air quality. Furthermore, fresh air can be introduced, and the introduced fresh air can be purified.

When only air outflowing of the second air outflowing opening 106 is required, the second air outflowing opening 106 is opened by the air guide plate 16, and the first air outlet 2211 is closed by the air guide mechanism 60. The air introduced from indoors and outdoors flows upward into the air outflowing chamber 201 of the air outflowing housing 2 after being purified by the purification component 43, and then is blown out indoors through the two second air outlets 211 and the two second air outflowing openings 106 in sequence after being humidified by the humidification component 42. The air introduced from indoors and outdoors no longer flow out from the first air outflowing opening 105, but flow out indoors from the second air outlets 211 at the two sides through the second air outflowing opening 106. Therefore, the indoor air can be purified and humidified to improve the indoor air quality. Furthermore, the fresh air can be introduced, and the introduced fresh air can be purified and humidified.

When simultaneous air outflowing from the first air outflowing opening 105 and the second air outflowing opening 106 is required, the first air outlet 2211 is opened by the air guide mechanism 60, and the second air outflowing opening 106 is opened by the air guide plate 16. After being driven by the first fan component 41 to be introduced into the first fan component 41 from the air inlet 411, airflow flows upwards and is purified by the purification component 43 first. The purified airflow flows upwards into the air outflowing chamber 201. A part of the airflow introduced into the air outflowing chamber 201, without being humidified by the humidification component 42, is blown upwards into the air induction chamber through the first air outlet 2211 and is blown out indoors through the first air outflowing opening 105, and another part is humidified by the humidification component 42 and then flows out from two second air outlets 211 and two second air outflowing openings 106 in sequence. The air introduced from indoors and outdoors is simultaneously blown out from the first air outflowing opening 105 and the second air outflowing opening 106, and therefore the air outflowing range is enlarged to realize the multidimensional air outflowing. In this case, the indoor air introduced from the air inlet 411 can be purified and partially humidified, and then flows indoors. In this way, the indoor air quality can be quickly and effectively improved. Furthermore, the fresh air can be introduced, and the introduced fresh air can be purified and partially humidified.

In another exemplary embodiment of the present disclosure, when the air treatment device 20 operates, the first air outlet 2211 may be in a normally open state. For example, the first air outlet 2211 is opened when the first fan component 41 is powered on to operate, and the first air outlet 2211 is correspondingly closed when the first fan component 41 is shut down. Whether to open the second air outflowing opening 106 may be determined based on whether there is a humidification demand, and the second air outflowing opening 106 may be opened when there is a humidification demand, and may be closed when there is no humidification demand.

When both the air treatment device 20 and the air heat exchange device 80 operate, the indoor temperature can be adjusted while improving the indoor air quality. The operational state of the air treatment device 20 can be described with reference to the above.

In the description of this specification, descriptions with reference to the terms "an embodiment", "some embodiments", "an exemplary embodiment", "an example", "a specific example", or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

Although embodiments of the present disclosure have been illustrated and described, it is conceivable for those of ordinary skill in the art that various changes, modifications, replacements, and variations can be made to these embodiments without departing from the principles and spirit of the present disclosure. The scope of the present disclosure shall be formed by the claims as appended and their equivalents.

What is claimed is:

1. An air conditioner comprising:

a casing having an air outflowing cavity, a side wall of the air outflowing cavity having an air outflowing opening;

an air treatment device disposed in the casing, the air treatment device having an air inlet and an air outlet; and a light emission component provided at an outer peripheral side of the air outlet and configured to emit light towards the air outflowing cavity, the light emission component including:

a lamp socket having a mounting recess;

a light emission member disposed in the mounting recess; and a lamp cover covering at an open end of the lamp socket, at least part of the lamp cover being accommodated in the mounting recess.

2. The air conditioner according to claim 1, wherein the air treatment device includes:

an air treatment unit; and an air outflowing housing having an air outflowing chamber in communication with an inner chamber of the air treatment unit, the air outlet being formed at the air outflowing housing and in communication with the air outflowing chamber, an accommodation chamber configured to accommodate the light emission component being formed at the air outflowing housing, and a side of the accommodation chamber facing towards the air outflowing cavity being provided with a light-permeable member.

3. The air conditioner according to claim 2, further comprising:

an air guide mechanism disposed in the casing and movable in an axial direction of the air outlet to open or close the air outlet;

wherein at least part of a projection of the light-permeable member on a reference surface is located within a projection of the air guide mechanism on the reference surface, the reference surface being perpendicular to the axial direction of the air outlet.

4. The air conditioner according to claim 3, wherein:

the projection of the light-permeable member on the reference surface is located within the projection of the air guide mechanism on the reference surface; and a light transmission channel is formed between the air guide mechanism and the air outflowing housing when the air outlet is closed by the air guide mechanism, the light transmission channel having a radial inner end facing towards the light-permeable member and a radial outer end formed as a light outlet.

5. The air conditioner according to claim 2, wherein:

each of the accommodation chamber, the light emission component, and the light-permeable member extends in a circumferential direction of the first air outlet, and the light-permeable member has a radial width smaller than a radial width of the light emission component; or the light-permeable member is in an annular shape and formed as a periphery of the air outlet.

6. The air conditioner according to claim 2, wherein:

the air outflowing housing includes a housing body, an air outflowing member, and a fixation support;

a top of the housing body has a mounting opening;

the air outflowing member is disposed at the mounting opening and the air outlet is formed at the air outflowing member;

the fixation support is disposed at the air outflowing member and located at the outer peripheral side of the air outlet;

the fixation support is connected to the housing body; and the accommodation chamber is formed between the fixation support and the air outflowing member.

7. The air conditioner according to claim 6, wherein:

the air outflowing member has an accommodation groove located at the outer peripheral side of the air outlet;

the light emission component is disposed in the accommodation groove, the accommodation groove has a side opened towards the air outflowing cavity to form an opening;

the fixation support covers a part of the opening in a radial direction of the air outlet;

the accommodation chamber is formed between an inner wall of the accommodation groove and the fixation support; and an uncovered part of the opening is formed as the light-permeable member.

8. The air conditioner according to claim 2, wherein:

a side of the light emission component facing away from the light-permeable member is provided with an engagement member; and a wall of the accommodation chamber has an engagement hole engaged with the engagement member.

9. The air conditioner according to claim 2, wherein:

the air outflowing opening is a first air outflowing opening and the air outlet is a first air outlet;

a peripheral side wall of the air outflowing housing has at least one second air outlet; and the casing has a second air outflowing opening facing towards the second air outlet and in communication with the second air outlet.

10. The air conditioner according to claim 1, further comprising:

an air guide mechanism disposed in the casing and movable in an up-down direction to open or close the air outlet; and a drive assembly including a drive mechanism and a drive member disposed at the air guide mechanism, the drive mechanism being engaged with the drive member in a transmission manner to drive the air guide mechanism to move up and down.

11. The air conditioner according to claim 10, wherein:

the air guide mechanism includes an air guide mechanism body and a decoration cover covering at a top of the air guide mechanism body, the air guide mechanism body including a first air guide member and a second air guide member connected to each other in a horizontal direction, each of the first air guide member and the second air guide member being an independent molded member;

the air guide mechanism body is detachably connected to the decoration cover;

the first air guide member is detachably connected to the second air guide member; and the drive member is disposed at one of the first air guide member and the second air guide member.

12. The air conditioner according to claim 10, wherein:

the air guide mechanism includes a liner plate disposed between the air guide mechanism body and the decoration cover, the liner plate being detachably connected to the air guide mechanism body;

the decoration cover is connected to the liner plate by an adhesive layer; and at least a middle part of the liner plate protrudes upwards to form a protrusion, the adhesive layer being disposed at the protrusion.

13. The air conditioner according to claim 10, wherein:

the air guide mechanism includes an air guide mechanism body, the air guide mechanism body including a first air guide member and a second air guide member connected to each other in a horizontal direction;

the first air guide member includes a first air guide part and a first movable part connected below the first air guide part;

the second air guide member includes a second air guide part and a second movable part connected below the second air guide part, a butt-joint line between the first air guide part and the second air guide part surrounding the first air guide part, a butt-joint line between the first movable part and the second movable part extending in the up-down direction, and the drive member being disposed at one of the first movable part and the second movable part; and the butt-joint line between the first air guide part and the second air guide part has a length greater than half of a circumference of the first air guide part.

14. The air conditioner according to claim 10, wherein:

the air outflowing cavity is formed in the casing;

the air outflowing opening is formed at a front side wall of the air outflowing cavity;

the air outlet is in communication with the air outflowing opening through the air outflowing cavity when the air outlet is opened by the air guide mechanism;

the air guide mechanism includes an air guide mechanism body, the air guide mechanism body including a first air guide member and a second air guide member connected to each other in a horizontal direction;

the decoration cover and at least part of the air guide mechanism body are located in the air outflowing cavity;

the at least part of the air guide mechanism body located in the air outflowing cavity has an airflow channel extending through the air guide mechanism body in a front-rear direction;

the first air guide member is butt-jointed to the second air guide member in the front-rear direction; and the airflow channel includes a first airflow channel formed in the first air guide member and a second airflow channel formed in the second air guide member.

15. The air conditioner according to claim 10, wherein:

the drive member comprises includes rack;

the drive mechanism includes a gear transmission mechanism including a plurality of gears engaged in sequence, one of the plurality of gears located at a starting end of the gear transmission mechanism being connected to a drive motor, and another one of the plurality of gears located at a tail end of the gear transmission mechanism being engaged with the rack;

the drive assembly further includes a drive box having an avoidance opening;

the drive mechanism is disposed in the drive box, and a part of the gear located at the tail end of the gear transmission mechanism extending out of the drive box through the avoidance opening and being engaged with the rack;

a first chamber and a second chamber are formed in the drive box, each of the drive motor and the gear located at the starting end of the gear transmission mechanism being located in the first chamber, remaining of the plurality of gears of the gear transmission mechanism being all located in the second chamber; and the avoidance opening is formed at a side wall of the second chamber, and the first chamber is located outside an air duct of the air treatment device.

16. The air conditioner according to claim 1, wherein:

the lamp cover is sealingly connected to the lamp socket by a sealant;

an inner peripheral wall of the mounting recess has a limit surface, the lamp cover abutting with the limit surface; or a side of the lamp cover adjacent to the light emission member is provided with a press protrusion, the press protrusion abutting against the light emission member.

17. The air conditioner according to claim 1, wherein:

the light emission component further includes a light guide hood connected to the lamp socket and covering the lamp cover; and one of the light guide hood and the lamp socket is provided with an engagement member, and another one of the light guide hood and the lamp socket has an engagement hole engaged with the engagement member.

18. The air conditioner according to claim 17, wherein:

each of the lamp socket and the light guide hood is in an annular shape;

the engagement member is provided at each of an inner peripheral wall and an outer peripheral wall of the lamp socket;

the engagement hole is formed at each of an inner peripheral wall and an outer peripheral wall of the light guide hood;

the inner peripheral wall of the lamp socket has a first limit surface; and the outer peripheral wall of the lamp socket has a second limit surface, the inner peripheral wall of the light guide hood abutting with the first limit surface, and the outer peripheral wall of the light guide hood abutting with the second limit surface.

19. An air conditioner comprising:

a casing having an air outflowing cavity, a side wall of the air outflowing cavity having an air outflowing opening;

an air treatment device disposed in the casing, the air treatment device having an air inlet and an air outlet; and a light emission component provided at an outer peripheral side of the air outlet and configured to emit light towards the air outflowing cavity;

wherein the air treatment device includes:

an air treatment unit; and an air outflowing housing having an air outflowing chamber in communication with an inner chamber of the air treatment unit, the air outlet being formed at the air outflowing housing and in communication with the air outflowing chamber, an accommodation chamber configured to accommodate the light emission component being formed at the air outflowing housing, and a side of the accommodation chamber facing towards the air outflowing cavity being provided with a light-permeable member.

20. An air conditioner comprising:

a casing having an air outflowing cavity, a side wall of the air outflowing cavity having an air outflowing opening;

an air treatment device disposed in the casing, the air treatment device having an air inlet and an air outlet;

a light emission component provided at an outer peripheral side of the air outlet and configured to emit light towards the air outflowing cavity;

an air guide mechanism disposed in the casing and movable in an up-down direction to open or close the air outlet; and a drive assembly including a drive mechanism and a drive member disposed at the air guide mechanism, the drive mechanism being engaged with the drive member in a transmission manner to drive the air guide mechanism to move up and down.

* * * * *